United States Patent
Zhong et al.

(10) Patent No.: US 11,007,430 B2
(45) Date of Patent: May 18, 2021

(54) VR MOTION CONTROL METHOD, MULTI-DIMENSIONAL MOTION PLATFORM AND THRUST UNIVERSAL SPHERICAL PLAIN BEARING

(71) Applicants: XI'AN KISSFUTURE NETWORK TECHNOLOGY CO., LTD, Shaanxi (CN); GUANGZHOU LEADCOM SEATING CO., LTD, Guangdong (CN)

(72) Inventors: Wei Zhong, Shaanxi (CN); Ying Lin, Shaanxi (CN); Hengke Liu, Guangdong (CN); Lu Wang, Shaanxi (CN)

(73) Assignees: XI'AN KISSFUTURE NETWORK TECHNOLOGY CO., LTD, Shaanxi (CN); GUANGZHOU LEADCOM SEATING CO., LTD, Guangdong (CN)

( * ) Notice: Subject to any disclaimer, the term of this patent is extended or adjusted under 35 U.S.C. 154(b) by 0 days.

(21) Appl. No.: 16/468,117

(22) PCT Filed: Jan. 24, 2017

(86) PCT No.: PCT/CN2017/072459
§ 371 (c)(1),
(2) Date: Jun. 10, 2019

(87) PCT Pub. No.: WO2018/107565
PCT Pub. Date: Jun. 21, 2018

(65) Prior Publication Data
US 2020/0070045 A1   Mar. 5, 2020

(30) Foreign Application Priority Data

Dec. 14, 2016   (CN) .......................... 201611154622.5
Dec. 14, 2016   (CN) .......................... 201611155026.9

(Continued)

(51) Int. Cl.
*A63F 13/00*   (2014.01)
*A63F 13/22*   (2014.01)
(Continued)

(52) U.S. Cl.
CPC ............ *A63F 13/22* (2014.09); *A63F 13/211* (2014.09); *A63F 13/26* (2014.09); *A63F 2300/8082* (2013.01)

(58) Field of Classification Search
None
See application file for complete search history.

(56) References Cited

U.S. PATENT DOCUMENTS 5,366,375 A * 11/1994 Sarnicola ................. G09B 9/12
434/29
5,374,879 A * 12/1994 Pin ........................... B25J 5/007
180/21

(Continued)

FOREIGN PATENT DOCUMENTS

CN   203176163 U   9/2013
CN   103388619 A   11/2013

(Continued)

*Primary Examiner* — Paul A D'Agostino
(74) *Attorney, Agent, or Firm* — Novick, Kim & Lee, PLLC; Allen Xue

(57) ABSTRACT

A system for virtual reality (VR) motion control includes a multi-dimensional motion platform and a thrust universal spherical plain bearing. The VR motion control method includes: setting parameters; calibrating a device; obtaining parameters; receiving a head-mounted display device tracking packet and/or an action control packet; determining whether a real-time angle difference is greater than a set dead zone angle; and calculating a difference between a current angle of a head-mounted display device and a (Continued)

current status of the multi-dimensional motion platform, and feeding the difference into an action control system of the multi-dimensional motion platform, to eliminate the difference. The multi-dimensional motion platform uses single-point bearing or single-point lifting bearing and lever traction-type transmission, thereby realizing functions of swinging and rotating in all directions. The thrust universal spherical plain bearing integrates a common thrust universal spherical plain bearing with a plane thrust bearing.

10 Claims, 16 Drawing Sheets

(30) Foreign Application Priority Data

Dec. 14, 2016 (CN) .......................... 201611156032.6
Dec. 14, 2016 (CN) .......................... 201611156037.9

(51) Int. Cl.
*A63F 13/211* (2014.01)
*A63F 13/26* (2014.01)

(56) References Cited

U.S. PATENT DOCUMENTS

| | | | |
|---|---|---|---|
| 7,900,874 B2* | 3/2011 | Fiala | F03G 7/10 244/171.5 |
| 2002/0055086 A1 | 5/2002 | Hodgetts et al. | |
| 2006/0213306 A1* | 9/2006 | Hayes | B25J 9/023 74/490.01 |
| 2011/0170945 A1 | 7/2011 | Gagnon et al. | |
| 2011/0219893 A1* | 9/2011 | Fiala | F03G 7/10 74/5.34 |
| 2013/0017893 A1* | 1/2013 | Feuer | A63G 7/00 472/43 |
| 2015/0297934 A1* | 10/2015 | Agrawal | A61H 1/0266 482/4 |
| 2016/0063884 A1* | 3/2016 | Ausenda | G09B 9/066 434/60 |
| 2016/0303484 A1* | 10/2016 | Masutti | G09B 9/12 |

FOREIGN PATENT DOCUMENTS

| | | |
|---|---|---|
| CN | 203670483 U | 6/2014 |
| CN | 204175791 U | 2/2015 |
| CN | 104759095 A | 7/2015 |
| CN | 105903190 A | 8/2016 |
| JP | H11201150 A | 7/1999 |
| KR | 20070021467 A | 2/2007 |

* cited by examiner

VR MOTION CONTROL METHOD, MULTI-DIMENSIONAL MOTION PLATFORM AND THRUST UNIVERSAL SPHERICAL PLAIN BEARING

FIELD

The present disclosure relates to a VR motion control method, a multi-dimensional motion platform and a thrust universal spherical plain bearing, and in particular, to a VR motion control method, a motion platform capable of implementing a rotation and a free swing, and a thrust universal spherical plain bearing used for bearing of the multi-dimensional motion platform.

BACKGROUND

A motion platform is an apparatus capable of simulating a motion status of a manned device, for example, simulating a car, a ship, an aircraft and so on. There have been a number of device solutions on the current market.

A transmission technology of an existing apparatus is using a combined mechanism of linear motors and using one motor to control a one-dimensional telescopic motion, thereby forming a multi-degree of freedom motion of the platform. According to the transmission technology, power of a transmission structure is used to bear weight on the platform and lift up the platform to perform a motion.

In an existing three-degree of freedom motion platform, three points are used to support the platform, a support bar can perform a linear motion, and controlled motions in three dimensions: a front-back dimension, a right-left dimension and an up-down dimension can be realized by controlling coordinated motions among three support bars, and motion simulation can be realized in combination with a visual effect.

The three-degree of freedom motion platform has been widely used in various fields such as movie theaters, games and amusement parks.

Main defects of the three-degree of freedom motion platform are as follows.

1. The platform has large size and heavy weight, thereby being inconvenient to transport, mount and maintain.

2. The platform needs to be equipped with devices such as a large-sized seat, which causes a relatively high overall height and a relatively large occupied area.

3. Motions in a front-back axis and a left-right axis are mainly realized, up-down amplitude is very small, and the platform cannot implement a rotation function.

4. A need for an additional high-power drive results in relatively high mechanical noise.

At present, there already has a six-degree of freedom platform that can implement finer motion control and a small amount of axial rotation. However, all six-degree of freedom motion platforms at the present stage are large and bulky devices having high costs in all aspects, which goes against personal use or personalized customization and restricts multi-field popularization of a motion simulation device.

At present, VR motion platforms are all obtained by modifying according to 4d/5d and other theater seat technologies. In a main structure, three electric cylinders, double electric cylinders, or six electric cylinders are used as a motion platform drive, where a six-electric cylinder drive has high cost, thereby being relatively rare. During use, coordinate records of an electric cylinder that are recorded in advance are read by using special software, so as to control a motion of the electric cylinder and realize motion control of a plurality of degrees of freedom. Being an electric cylinder supporting structure, except a six-electric cylinder platform that can perform rotation with relatively small amplitude (not greater than 30 degrees), all three- or double-electric cylinder structures cannot perform a rotary motion. In addition, electric cylinders in the solution are responsible for bearing, resulting in large overall weight, a problem that overall power needs to reach kilowatts to ensure normal work, and relatively high requirements for the environment.

Especially for a scenario requiring fixed lifting or lifting and moving under a rail, an existing six-degree of freedom platform cannot meet the requirement at all. Therefore, it is urgent to provide a motion platform with a lifting structure.

If weight of all objects on the multi-dimensional motion platform needs to be borne by one structure, a special thrust universal spherical plain bearing is required to share gravity with other structures, so as to achieve functions of swinging and rotating in all directions.

SUMMARY

A purpose of the present disclosure is to provide a VR motion control method. A specific function of automatic follow-up rotation of a seat is realized by identifying a head rotation motion of an operator. In addition, in combination with a unique motion platform design, a rotation effect and a swing effect are combined organically, thereby realizing a brand-new VR motion experience.

Another purpose of the present disclosure is to provide, on the premise of ensuring a multi-dimensional motion, a miniaturized multi-dimensional motion platform that has a reduced cost and that can implement a rotation and a free swing based on bracket bearing or lifting bearing.

Still another purpose of the present disclosure is to provide a thrust universal spherical plain bearing, so that the multi-dimensional motion platform can implement functions of swinging and rotating in all directions without bearing weight.

The present disclosure has the following technical solutions:

a VR motion control method, including:

1) setting a dead zone angle of a head-mounted display device relative to a multi-dimensional motion platform, setting an extreme value of a head rotation angle coefficient, and setting a rotational speed parameter and a swing travel parameter of the multi-dimensional motion platform, where the multi-dimensional motion platform is a motion platform that can implement a rotation and a free swing, and the extreme value is a maximum absolute value;

2) calibrating the multi-dimensional motion platform and the head-mounted display device, and obtaining a horizontal angle and a maximum swing angle of the multi-dimensional motion platform;

3) obtaining parameters:

3.1) obtaining a direction parameter:

3.1.1) outputting, by a built-in or external angular speed sensor and a built-in or external acceleration sensor of the head-mounted display device, a cumulative angular speed value and a cumulative acceleration value, respectively;

3.1.2) obtaining an instantaneous head acceleration value and an instantaneous head angular speed value through integration;

3.1.3) calculating an absolute direction vector of the head-mounted display device based on the instantaneous values;

3.1.4) encapsulating an information header and the absolute direction vector into a head-mounted display device tracking packet;

3.2) obtaining action parameters:

3.2.1) obtaining an instantaneous status parameter of a controlled object according to a status of a VR game, or directly obtaining a preset action parameter of a specified scenario in a video;

3.2.2) encapsulating the information header and the instantaneous status parameter or the information header and the preset action parameter into the action control packet;

4) receiving, by a controller, the head-mounted display device tracking packet and/or the action control packet;

5) determining:

extracting the information header; and if the information header is head-mounted display device tracking data, entering step 6; if the information header is action parameter data, entering step 7; or if the information header is neither of the two, discarding the packet;

6) calculating a current deflection angle of the head-mounted display device based on the absolute direction vector in the packet, then calculating a real-time angle difference based on the angle and a current deflection angle of the multi-dimensional motion platform, and determining, in real time, whether the real-time angle difference is greater than a set dead zone angle; and if yes, outputting an instantaneous rotation pulse, and feeding the instantaneous rotation pulse into a rotation motor of the multi-dimensional motion platform; or if not, continuing to calculate a real-time angle difference based on a next head-mounted display device tracking packet; and 7) calculating a difference between a current angle of the head-mounted display device and a current status of the multi-dimensional motion platform based on the instantaneous status parameter or the preset action parameter, and feeding the difference into an action control system of the multi-dimensional motion platform, to eliminate the difference.

A first type of step 6 in the above-mentioned motion control method is specifically as follows:

6.1) extracting the set dead zone angle;

6.2) extracting the current deflection angle of the head-mounted display device from the absolute direction vector in the packet, and calculating the real-time angle difference based on the angle and the current deflection angle of the multi-dimensional motion platform;

6.3) comparing the dead zone angle with the real-time angle difference; and if the real-time angle difference is smaller than the dead zone angle, returning to step 6.2; or if the real-time angle difference is greater than or equal to the dead zone angle, subtracting the dead zone angle from the absolute value of the real-time angle difference, to obtain a control angle difference;

6.4) determining whether the control angle difference is greater than the extreme value of the head rotation angle coefficient; and if yes, fixing the extreme value of the head rotation angle coefficient;

6.5) calculating an actual rotation speed according to the following formula:

Actual rotation speed=(Control angle difference/Extreme value of a head rotation angle coefficient)×Rotational speed parameter; and 6.6) converting the actual rotation speed into an instantaneous rotation pulse, and feeding the instantaneous rotation pulse into the rotation motor of the multi-dimensional motion platform.

A second type of step 6 in the above-mentioned motion control method is specifically as follows:

6.1) extracting the current deflection angle of the head-mounted display device and the current deflection angle of the platform, to obtain the real-time angle difference;

6.2) determining whether the real-time angle difference is greater than the extreme value of the head rotation angle coefficient; and if yes, fixing the extreme value of the head rotation angle coefficient, and performing the following calculation:

New real-time angle difference=(Real-time angle difference/Extreme value of a head rotation angle coefficient)×90 degrees;

6.3) taking the sine value of the real-time angle difference as a speed coefficient;

6.4) calculating an actual rotation speed according to the following formula:

Actual rotation speed=Speed coefficient×Rotational speed parameter;

6.5) converting the actual rotation speed into an instantaneous rotation pulse, and feeding the instantaneous rotation pulse into the rotation motor of the multi-dimensional motion platform.

A third type of step 6 in the above-mentioned motion control method is specifically as follows:

6.1) extracting the set dead zone angle;

6.2) extracting the current deflection angle of the head-mounted display device and the current deflection angle of the multi-dimensional motion platform, to obtain the real-time angle difference;

6.3) comparing the dead zone angle with the real-time angle difference; and if the real-time angle difference is smaller than the dead zone angle, returning to step 6.2; or if the real-time angle difference is greater than or equal to the dead zone angle, subtracting the dead zone angle from the absolute value of the real-time angle difference, to obtain a control angle difference;

6.4) determining whether the real-time angle difference is greater than the extreme value of the head rotation angle coefficient; and if yes, fixing the extreme value of the head rotation angle coefficient, and performing the following calculation:

New real-time angle difference=(Real-time angle difference/Extreme value of a head rotation angle coefficient)×90 degrees;

6.5) taking the sine value of the real-time angle difference as a speed coefficient;

6.6) calculating an actual rotation speed according to the following formula:

Actual rotation speed=Speed coefficient×Rotational speed parameter;

6.7) converting the actual rotation speed into an instantaneous rotation pulse, and feeding the instantaneous rotation pulse into the rotation motor of the multi-dimensional motion platform.

To improve control precision, the above-mentioned motion control method further includes a step of performing track correction by using a built-in or external magnetic sensor of the head-mounted display device.

To avoid mis-operation, the above-mentioned information header is preferably device identification ID.

To prevent jitter, the above-mentioned sending rate at which a calculated current status difference is fed into an action control system is preferably greater than 10 packet/second.

A specific structure of the multi-dimensional motion platform in the above-mentioned motion control method includes a support unit and a traction unit, the support unit includes a motion platform, a thrust universal spherical plain bearing, a bearing platform, a motion and rotation traction rod and a bearing bracket; the thrust universal spherical plain bearing includes a shaft washer and a housing washer; the upper end of the motion and rotation traction rod is fixed in the shaft washer of the thrust universal spherical plain bearing; the lower bottom surface of the motion platform is fixedly connected to the upper end surface of the joint shaft washer of the thrust universal spherical plain bearing; the housing washer of the thrust universal spherical plain bearing is fixedly connected to the bearing platform; the bearing platform is arranged on the bearing foundation through the bearing bracket; the traction unit includes a universal extension coupling, a rotation motor, a traction platform and at least one traction assembly; the lower end of the motion and rotation traction rod is connected to the output end of the rotation motor through the universal extension coupling; the rotation motor is fixed on the traction platform; one end of the traction assembly is connected to the traction platform, and the other end of the traction assembly is connected to the bearing bracket, so as to adjust a tilt angle of the traction platform.

There are two different types of above-mentioned traction assemblies.

Type 1 is a ball screw assembly type. The traction unit has one, two, or three traction assemblies. The traction assembly includes a traction motor and a ball screw assembly; the traction motor is hinged with the bearing bracket, the output shaft of the traction motor is fixedly connected to a lead screw of the ball screw assembly, and a nut of the ball screw assembly is hinged with the traction platform. When the traction unit has two traction assemblies, an included angle between traction directions or traction direction projections of the two traction assemblies is 90 degrees. When the traction unit has three traction assemblies, an included angle between traction directions of any two traction assemblies is the same.

Type 2 is an electric screw rod slide rail type. The traction unit has one or two traction assemblies. When the traction unit has one traction assembly, the traction assembly is an electric screw rod slide rail of which a slide rail is fixed on the bearing bracket or the bearing foundation and of which a slide block is fixed to the traction platform; or when the traction unit has two traction assemblies, the first traction assembly is an electric screw rod slide rail of which a slide rail is fixed on the bearing bracket or the bearing foundation; the second traction assembly is an electric screw rod slide rail of which a slide rail is fixed on a slide block of the first traction assembly and of which a slide block is fixed to the traction platform; and an included angle between the two electric screw rod slide rails is 90 degrees.

A multi-dimensional motion platform, including a support unit and a traction unit, has a special feature that the support unit includes a motion platform, a thrust universal spherical plain bearing, a bearing platform, a motion and rotation traction rod and a bearing bracket; the thrust universal spherical plain bearing includes a shaft washer and a housing washer; the upper end of the motion and rotation traction rod is fixed in the shaft washer of the thrust universal spherical plain bearing; the lower bottom surface of the motion platform is fixedly connected to the upper end surface of the joint shaft washer of the thrust universal spherical plain bearing; the housing washer of the thrust universal spherical plain bearing is fixedly connected to the bearing platform;

the bearing platform is arranged on the bearing foundation through the bearing bracket; the traction unit includes a universal extension coupling, a rotation motor, a traction platform and at least one traction assembly; the lower end of the motion and rotation traction rod is connected to the output end of the rotation motor through the universal extension coupling; the rotation motor is fixed on the traction platform; one end of the traction assembly is connected to the traction platform, and the other end of the traction assembly is connected to the bearing bracket, so as to adjust a tilt angle of the traction platform.

There are two types of above-mentioned traction assemblies.

Type 1: the above-mentioned traction assembly includes a traction motor and a ball screw assembly. The traction motor is hinged with the bearing bracket. The output shaft of the traction motor is fixedly connected to a lead screw of the ball screw assembly. A nut of the ball screw assembly is hinged with the traction platform.

If only a left-right swing is needed, there may be one above-mentioned traction assembly.

If a free swing is needed, there may be two or three above-mentioned traction assemblies.

When there are two traction assemblies, an included angle between traction directions or traction direction projections of the two traction assemblies is 90 degrees.

When there are three traction assemblies, an included angle between traction directions of any two traction assemblies is the same.

Type 2: the above-mentioned traction unit has one or two traction assemblies. When the traction unit has one traction assembly, the traction assembly is an electric screw rod slide rail of which a slide rail is fixed on the bearing bracket or the bearing foundation and of which a slide block is fixed to the traction platform.

When the traction unit has two traction assemblies, the first traction assembly is an electric screw rod slide rail of which a slide rail is fixed on the bearing bracket or the bearing foundation; the second traction assembly is an electric screw rod slide rail of which a slide rail is fixed on a slide block of the first traction assembly and of which a slide block is fixed to the traction platform; and an included angle between the two electric screw rod slide rails is 90 degrees.

As a part of the present disclosure, the above-mentioned thrust universal spherical plain bearing may alternatively have three unique structures.

Structure 1: the thrust universal spherical plain bearing further includes a plane thrust bearing assembly;

the plane thrust bearing assembly includes balls, a cage, a bottom pad, an upper rail arranged on the lower bottom surface of the housing washer of the thrust universal spherical plain bearing and a lower rail arranged on the upper bottom surface of the bottom pad; and the lower bottom surface of the bottom pad of the plane thrust bearing assembly is fixedly connected to the bearing platform.

Structure 2: the thrust universal spherical plain bearing further includes a ball assembly;

the inner side surface of the housing washer of the thrust universal spherical plain bearing is a polygonal pyramid surface;

the ball assembly includes a ball pit formed in each side of the polygonal pyramid surface and a ball arranged in each ball pit; and a plurality of balls are arranged on a same plane and are in contact with the spherical outer surface of the shaft washer of the thrust universal spherical plain bearing separately.

Structure 3: the thrust universal spherical plain bearing further includes a roller assembly and a plane thrust bearing assembly;

the inner side surface of the housing washer of the thrust universal spherical plain bearing is a polygonal pyramid surface;

the roller assembly includes a roller pit formed in each side of the polygonal pyramid surface and a roller arranged in each roller pit;

a plurality of rollers are arranged on a same plane, arranged laterally, and in contact with the spherical outer surface of the shaft washer of the thrust universal spherical plain bearing separately;

the plane thrust bearing assembly includes balls, a cage, a bottom pad, an upper rail arranged on the lower bottom surface of the housing washer of the thrust universal spherical plain bearing and a lower rail arranged on the upper bottom surface of the bottom pad; and the lower bottom surface of the bottom pad of the plane thrust bearing assembly is fixedly connected to the bearing platform.

A multi-dimensional motion platform, including a support unit and a traction unit, has a special feature that the support unit includes a motion platform, a thrust universal spherical plain bearing, a bearing platform, a motion and rotation traction rod and a bearing bracket; the thrust universal spherical plain bearing includes a shaft washer and a housing washer; the upper end of the motion and rotation traction rod is fixedly connected to the upper bottom surface of the motion platform after penetrating through a shaft washer fixed to the thrust universal spherical plain bearing; the upper bottom surface of the motion platform is fixedly connected to the upper end surface of the joint shaft washer of the thrust universal spherical plain bearing; the housing washer of the thrust universal spherical plain bearing is fixedly connected to the bearing platform; the bearing platform is arranged on the bearing foundation or a hanging rail through the bearing bracket or a hanger; the traction unit includes a universal extension coupling, a rotation motor, a traction platform and at least one traction assembly; the upper end of the motion and rotation traction rod is connected to the output end of the rotation motor through the universal extension coupling; the rotation motor is fixed on the traction platform; one end of the traction assembly is connected to the traction platform, and the other end of the traction assembly is connected to the bearing bracket, so as to adjust a tilt angle of the traction platform.

There are two types of above-mentioned traction assemblies.

Type 1: the above-mentioned traction assembly includes a traction motor and a ball screw assembly; the traction motor is hinged with the bearing bracket; the output shaft of the traction motor is fixedly connected to a lead screw of the ball screw assembly; a nut of the ball screw assembly is hanged with the traction platform.

If only a left-right swing is needed, there may be one above-mentioned traction assembly.

If a free swing is needed, there may be two or three above-mentioned traction assemblies, wherein when there are two traction assemblies, an included angle between traction directions or traction direction projections of the two traction assemblies is 90 degrees; and when there are three traction assemblies, an included angle between traction directions of any two traction assemblies is the same.

Type 2: the above-mentioned traction unit has one or two traction assemblies; when the traction unit has one traction assembly, the traction assembly is an electric screw rod slide rail of which a slide rail is fixed on the bearing bracket or the bearing foundation and of which a slide block is fixed to the traction platform.

When the traction unit has two traction assemblies, the first traction assembly is an electric screw rod slide rail of which a slide rail is fixed on the bearing bracket or the bearing foundation; the second traction assembly is an electric screw rod slide rail of which a slide rail is fixed on a slide block of the first traction assembly and of which a slide block is fixed to the traction platform; and an included angle between the two electric screw rod slide rails is 90 degrees.

As a part of the present disclosure, the above-mentioned thrust universal spherical plain bearing may alternatively have three unique structures.

Structure 1: the thrust universal spherical plain bearing further includes a plane thrust bearing assembly;

the plane thrust bearing assembly includes balls, a cage, a bottom pad, an upper rail arranged on the lower bottom surface of the housing washer of the thrust universal spherical plain bearing and a lower rail arranged on the upper bottom surface of the bottom pad; and the lower bottom surface of the bottom pad of the plane thrust bearing assembly is fixedly connected to the bearing platform.

Structure 2: the thrust universal spherical plain bearing further includes a ball assembly;

the inner side surface of the housing washer of the thrust universal spherical plain bearing is a polygonal pyramid surface;

the ball assembly includes a ball pit formed in each side of the polygonal pyramid surface and a ball arranged in each ball pit; and a plurality of balls are arranged on a same plane and are in contact with the spherical outer surface of the shaft washer of the thrust universal spherical plain bearing separately.

Structure 3: the thrust universal spherical plain bearing further includes a roller assembly and a plane thrust bearing assembly;

the inner side surface of the housing washer of the thrust universal spherical plain bearing is a polygonal pyramid surface;

the roller assembly includes a roller pit formed in each side of the polygonal pyramid surface and a roller arranged in each roller pit;

a plurality of rollers are arranged on a same plane, arranged laterally, and in contact with the spherical outer surface of the shaft washer of the thrust universal spherical plain bearing separately;

the plane thrust bearing assembly includes balls, a cage, a bottom pad, an upper rail arranged on the lower bottom surface of the housing washer of the thrust universal spherical plain bearing and a lower rail arranged on the upper bottom surface of the bottom pad; and the lower bottom surface of the bottom pad of the plane thrust bearing assembly is fixedly connected to the bearing platform.

The structure-1 thrust universal spherical plain bearing, including a shaft washer and a housing washer, has a special feature of further including a plane thrust bearing assembly; the plane thrust bearing assembly includes balls, a cage, a bottom pad, an upper rail arranged on the lower bottom surface of the housing washer of the thrust universal spherical plain bearing, and a lower rail arranged on the upper bottom surface of the bottom pad; the lower bottom surface of the bottom pad of the plane thrust bearing assembly is fixedly connected to the bearing platform.

To reduce frictional force, the structure-2 thrust universal spherical plain bearing may further include a ball assembly on the basis of a structure of the structure-1 thrust universal spherical plain bearing. The inner side surface of the housing washer of the thrust universal spherical plain bearing is a polygonal pyramid surface; the ball assembly includes a ball pit formed in each side of the polygonal pyramid surface and a ball arranged in each ball pit; and a plurality of balls are arranged on a same plane and are in contact with the spherical outer surface of the shaft washer of the thrust universal spherical plain bearing separately.

To reduce frictional force, the structure-3 thrust universal spherical plain bearing may further include a roller assembly on the basis of a structure of the structure-1 thrust universal spherical plain bearing. The inner side surface of the housing washer of the thrust universal spherical plain bearing is a polygonal pyramid surface; the roller assembly includes a roller pit formed in each side of the polygonal pyramid surface and a roller arranged in each roller pit; a plurality of rollers are arranged on a same plane, arranged laterally, and in contact with the spherical outer surface of the shaft washer of the thrust universal spherical plain bearing separately.

A structure-4 thrust universal spherical plain bearing, including a shaft washer and a housing washer, has a special feature of further including a ball assembly. The inner side surface of the housing washer of the thrust universal spherical plain bearing is a polygonal pyramid surface; the ball assembly includes a ball pit formed in each side of the polygonal pyramid surface and a ball arranged in each ball pit; and a plurality of balls are arranged on a same plane and are in contact with the spherical outer surface of the shaft washer of the thrust universal spherical plain bearing separately.

The present disclosure has the following advantages.

1. In the prior art, motion control is achieved by controlling external devices with two hands. The method of the present disclosure liberates hands of an experiencer and directly realizes motion platform control by using the sensors.

2. The method of the present disclosure avoids misoperation of the platform by setting the dead zone angle. The dead zone angle can be set by the factory or set by the experiencer.

3. The method of the present disclosure has built-in sensors, which avoids an incompatibility problem between the motion platform and the head-mounted device.

4. The method of the present disclosure can also use a sine curve motion mode, which greatly improves the experience degree of the experiencer and makes the motion state smoother, the transition smoother, and the acceleration experience more real.

5. The method of the present disclosure limits the maximum rotation speed according to a sine curve value determining method, thereby avoiding potential safety hazards caused by too fast rotation speed of the motion platform.

6. The motion platform of the present disclosure uses single-point bearing or single-point hoisting bearing (that is, weight of all objects on the motion platform is borne by one structure of the present disclosure, and gravity is shared to other structures) and lever traction-type transmission, thereby realizing functions of swinging and rotating in all directions, decreasing motor load, reducing motor power, miniaturizing a device, and finally reducing costs in the aspects of materials, manufacture, transportation and so on.

7. The thrust universal spherical plain bearing of the present disclosure integrates a common thrust universal spherical plain bearing with a plane thrust bearing. In addition, a ball assembly or a roller assembly is added, thereby realizing bearing of the multi-dimensional motion platform in a heavy load condition, avoiding a technical problem that a driver needs to bear weight when the multi-dimensional motion platform implements functions of swinging and rotating in all directions, decreasing motor load, reducing motor power, miniaturizing a device, and finally reducing costs in the aspects of materials, manufacture, transportation, and so on.

BRIEF DESCRIPTION OF THE DRAWINGS

FIG. 7 represents rotation angle differences, X is an extreme value of a dead zone, Y-axis represents speed coefficients, and a coefficient corresponding to a highest position of a curve is 1;

Figure 1:
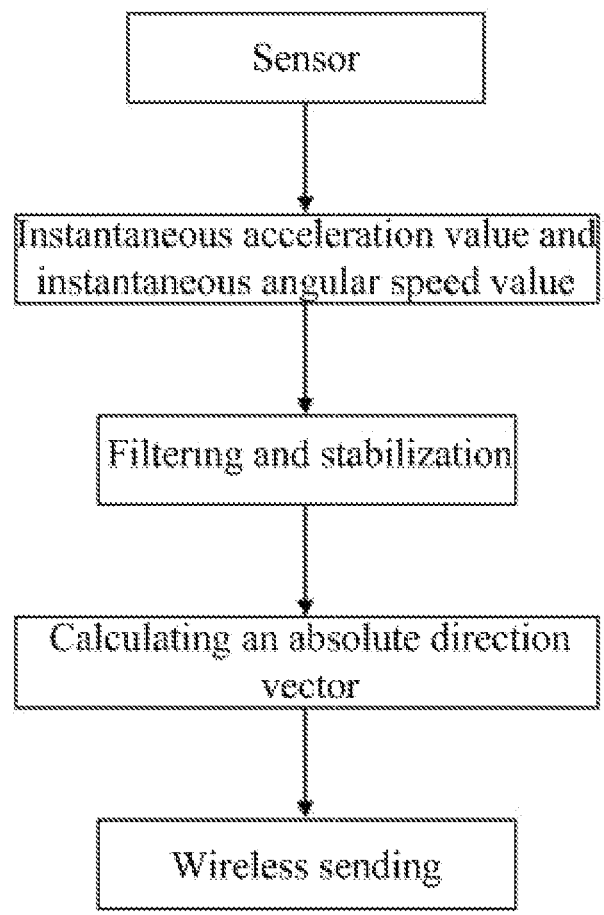
FIG. 1 is a flowchart of a step of obtaining a direction parameter in methods according to the present disclosure, wherein wireless sending may use the 2.4-2.5 g wireless communication protocol.
Figure 2:
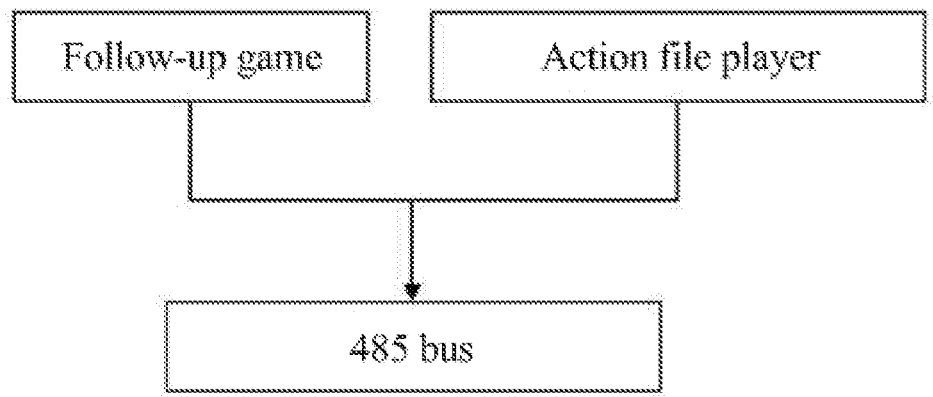
FIG. 2 is a flowchart of a step of obtaining action parameters in methods according to the present disclosure.
Figure 3:
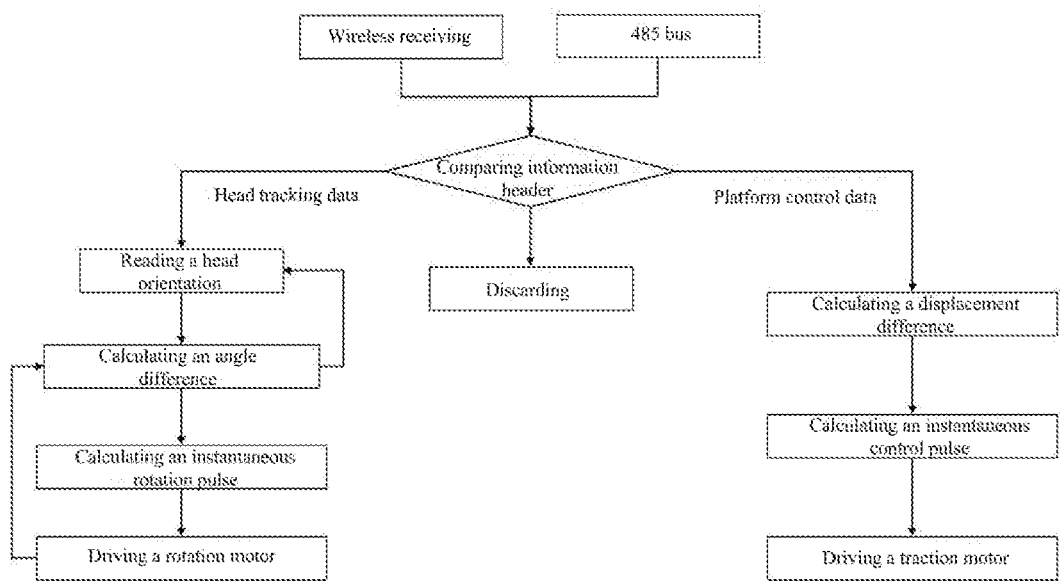
FIG. 3 is a flowchart of rotation or swing control in methods according to the present disclosure.
Figure 4:
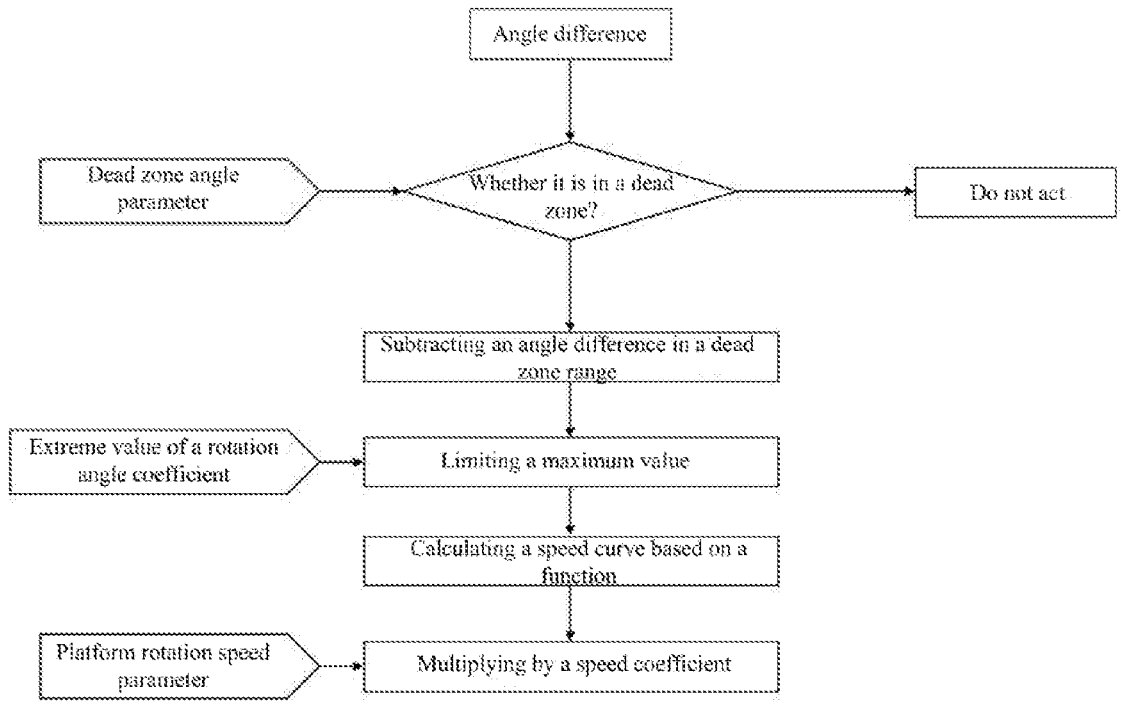
FIG. 4 is a flowchart of rotation control including dead zone control in methods according to the present disclosure.
Figure 5:
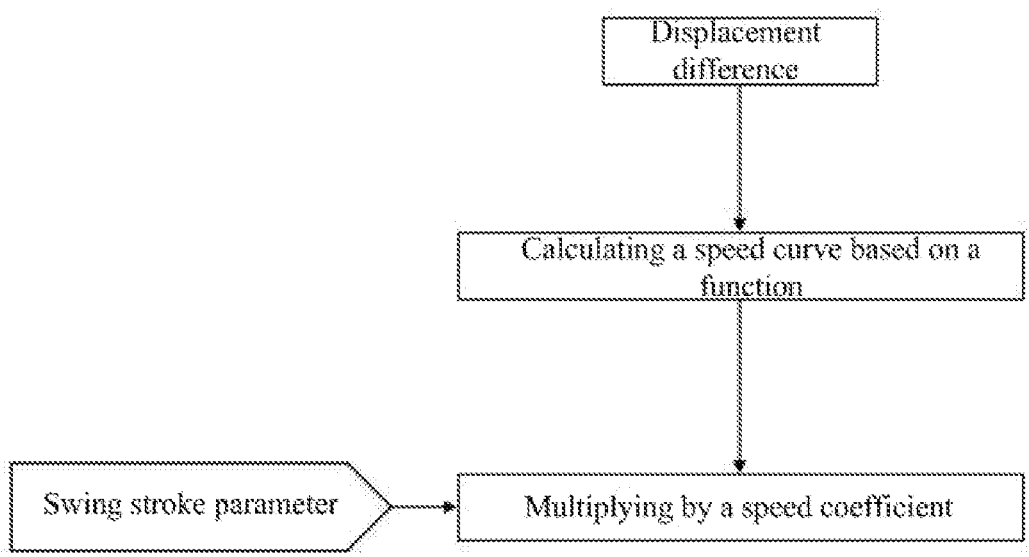
FIG. 5 is a flowchart of rotation control including curve control in methods according to the present disclosure.

In the drawings: 1: motion platform; 2: bearing platform; 3: motion and rotation traction rod; 4: bearing bracket; 5: bearing foundation; 6: traction motor; 7: rotation motor; 8: ball screw assembly; 81: nut; 82: lead screw; 9: universal extension coupling; 10: traction platform; 11: electric screw rod slide rail; 12: slide block; 13: slide rail; 14: thrust universal spherical plain bearing; 15: housing washer; 16: shaft washer; 17: first ball; 18: cage; 19: bottom pad; 20: lower rail; 21: upper rail; 22: polygonal pyramid surface; 23: second ball; 24: roller.

DETAILED DESCRIPTION OF THE EMBODIMENTS

The present disclosure provides a VR motion control method, including:

1) setting a dead zone angle of a head-mounted display device relative to a multi-dimensional motion platform, setting an extreme value of a head rotation angle coefficient, and setting a rotational speed parameter and a swing travel parameter of the multi-dimensional motion platform, wherein during calibration of a seat-helmet angle of the multi-dimensional motion platform, a value is obtained when a seat is at a zero location;

2) calibrating the multi-dimensional motion platform and the head-mounted display device, and obtaining a horizontal angle and a maximum swing angle of the multi-dimensional motion platform;

3) obtaining parameters:

3.1) obtaining a direction parameter:

3.1.1) outputting, by an angular speed sensor and an acceleration sensor, a cumulative angular speed value and a cumulative acceleration value, respectively, wherein the angular speed sensor and the acceleration sensor may use built-in sensors of the head-mounted display device, or may use independently external sensors;

3.1.2) obtaining an instantaneous head acceleration value and an instantaneous head angular speed value through integration, and performing filtering and stabilization;

3.1.3) calculating an absolute direction vector based on the instantaneous values; and 3.1.4) encapsulating an information header and the absolute direction vector into a head-mounted display device tracking packet, wherein the device identification ID may be the information header;

3.2) obtaining action parameters:

3.2.1) obtaining an instantaneous status parameter of a controlled object based on a status of a follow-up game; or obtaining a preset action parameter of a specified scenario by using an action file player; and 3.2.2) encapsulating the information header and the instantaneous status parameter or the information header and the preset action parameter into an action control packet;

4) receiving, by a controller, the head-mounted display device tracking packet in a wireless manner, and receiving an action control packet in a 485 bus manner at the same time;

5) determining:

extracting the information header; and if the information header is head-mounted display device tracking data, entering step 6; if the information header is action parameter data, entering step 7; or if the information header is neither of the two, discarding the packet;

6) calculating a real-time angle difference based on a current head direction deflection angle of the head-mounted display device and a current deflection angle of the multi-dimensional motion platform, and determining, in real time, whether the angle difference is greater than a set dead zone angle; and if yes, outputting an instantaneous rotation pulse, and feeding the instantaneous rotation pulse into a rotation motor of the multi-dimensional motion platform; or if not, continuing to calculate a real-time angle difference; and 7) calculating a displacement difference based on a current angle in the action parameters and a current status of the motion platform, to obtain an instantaneous control pulse; and feeding the instantaneous control pulse into a traction motor of an action control system, wherein the sending rate is preferably greater than 10 packet/second, to realize jitter-free control.

Step 6 has various implementations. A first implementation does not use curve control, and specifically includes the following steps:

6.1) extracting the set dead zone angle;

6.2) extracting the current deflection angle of the head-mounted display device and the current deflection angle of the multi-dimensional motion platform, to obtain the real-time angle difference;

6.3) comparing the dead zone angle with the real-time angle difference; and if the real-time angle difference is smaller than the dead zone angle, returning to step 6.2; or if the real-time angle difference is greater than or equal to the dead zone angle, subtracting the dead zone angle from the absolute value of the real-time angle difference, to obtain a control angle difference;

6.4) determining whether the control angle difference is greater than an extreme value of a head rotation angle coefficient; and if yes, fixing the extreme value of the head rotation angle coefficient;

6.5) calculating an actual rotation speed according to the following formula:

Actual rotation speed=(Control angle difference/Extreme value of a head rotation angle coefficient)×Rotational speed parameter;

6.6) converting the actual rotation speed into an instantaneous rotation pulse, and feeding the instantaneous rotation pulse into the rotation motor of the multi-dimensional motion platform.

A second implementation of step 6 is not suitable for dead zone control, and specifically includes the following steps:

6.1) extracting the current deflection angle of the head-mounted display device and the current deflection angle of the platform, to obtain the real-time angle difference;

6.2) determining whether the real-time angle difference is greater than the extreme value of the head rotation angle coefficient; and if yes, fixing the extreme value of the head rotation angle coefficient, and performing the following calculation:

New real-time angle difference=(Real-time angle difference/Extreme value of a head rotation angle coefficient)×90 degrees;

6.3) taking the sine value of the real-time angle difference as a speed coefficient;

6.4) calculating an actual rotation speed according to the following formula:

Actual rotation speed=Speed coefficient×Rotational speed parameter;

6.5) converting the actual rotation speed into an instantaneous rotation pulse, and feeding the instantaneous rotation pulse into the rotation motor of the multi-dimensional motion platform.

A third implementation of step 6 uses dead zone-and-curve integrated control, and specifically includes the following steps:

6.1) extracting the set dead zone angle;

6.2) extracting the current deflection angle of the head-mounted display device and the current deflection angle of the multi-dimensional motion platform, to obtain the real-time angle difference;

6.3) comparing the dead zone angle with the real-time angle difference; and if the real-time angle difference is smaller than the dead zone angle, returning to step 6.2; or if the real-time angle difference is greater than or equal to the dead zone angle, subtracting the dead zone angle from the absolute value of the real-time angle difference, to obtain a control angle difference;

6.4) determining whether the real-time angle difference is greater than the extreme value of the head rotation angle coefficient; and if yes, fixing the extreme value of the head rotation angle coefficient, and performing the following calculation:

New real-time angle difference=(Real-time angle difference/Extreme value of a head rotation angle coefficient)×90 degrees;

6.5) taking the sine value of the real-time angle difference as a speed coefficient;

6.6) calculating an actual rotation speed according to the following formula:

Actual rotation speed=Speed coefficient×Rotational speed parameter;

6.7) converting the actual rotation speed into an instantaneous rotation pulse, and feeding the instantaneous rotation pulse into the rotation motor of the multi-dimensional motion platform.

A principle of the method in the present disclosure is as follows.

An actual space status vector, namely an actual orientation of a head of a person is calculated based on data collected by fixing a device including 9 axis sensor modules on an induction device on the head of an operator (for example, 3 axis gyroscopes+3 axis accelerometers, and when necessary, 3 axis magnetic induction meters are further added) according to a certain algorithm (in which the 3 axis accelerometers are used to calculate and determine a head posture, the 3 axis gyroscopes are used to calculate and recognize a real-time head rotation angle, and the 3 axis magnetic induction meters are used to calculate and correct an offset). The data and a device ID are sent to a control system in a wireless or wired manner.

The control system may receive various control signals. When receiving an actual head orientation signal, the control system compares the orientation with an orientation of a base of the control system. If the quantity of degrees is greater than a predetermined dead zone size, the rotation motor is driven to perform rotary compensation until the deflection angle is smaller than a dead zone angle (the dead zone angle indicates that the system does not respond when a rotation angle is smaller than a certain angle).

Figure 6:
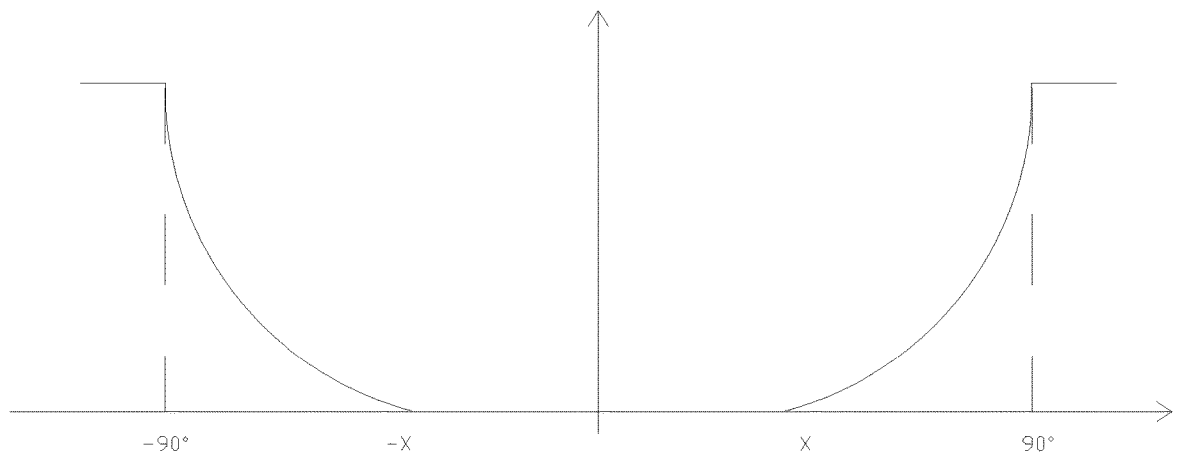
FIG. 6 is a sine response curve used in speed coefficient calculation in methods according to the present disclosure.
Figure 7:
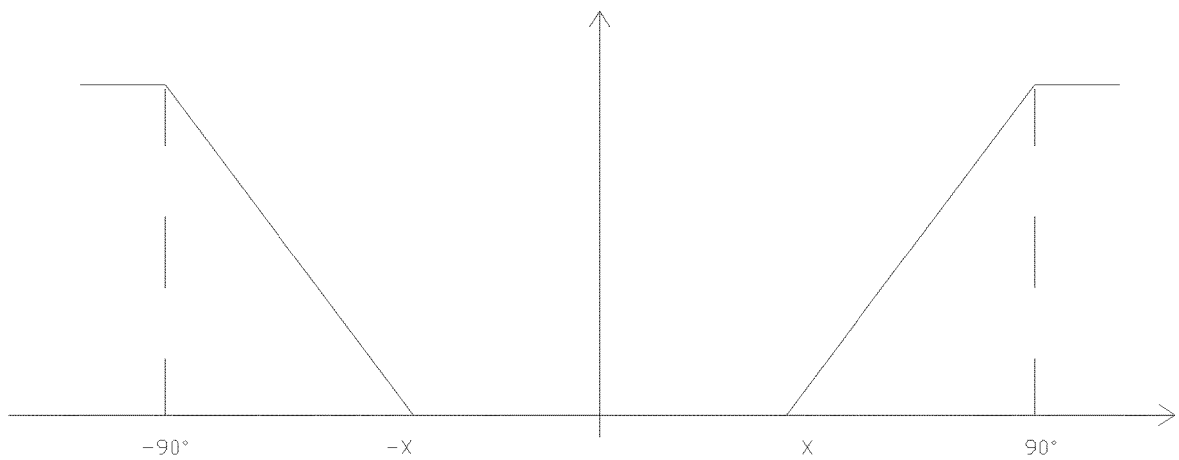
FIG. 7 is a response straight line used in speed coefficient calculation in methods according to the present disclosure, wherein X-axis in FIG. 6
Figure 8:
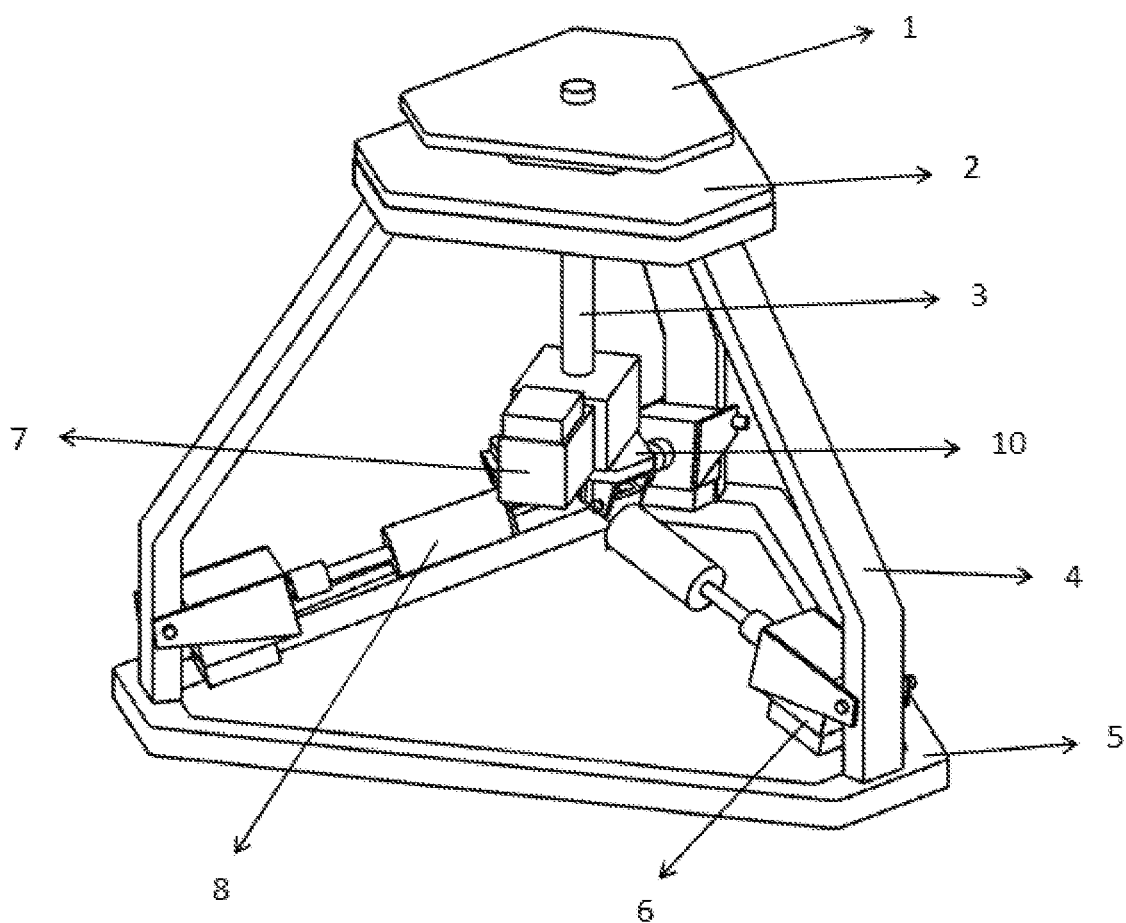
FIG. 8 is a schematic structural diagram of a bearing-type multi-dimensional motion platform using a triangular push rod solution according to the present disclosure.
Figure 9:
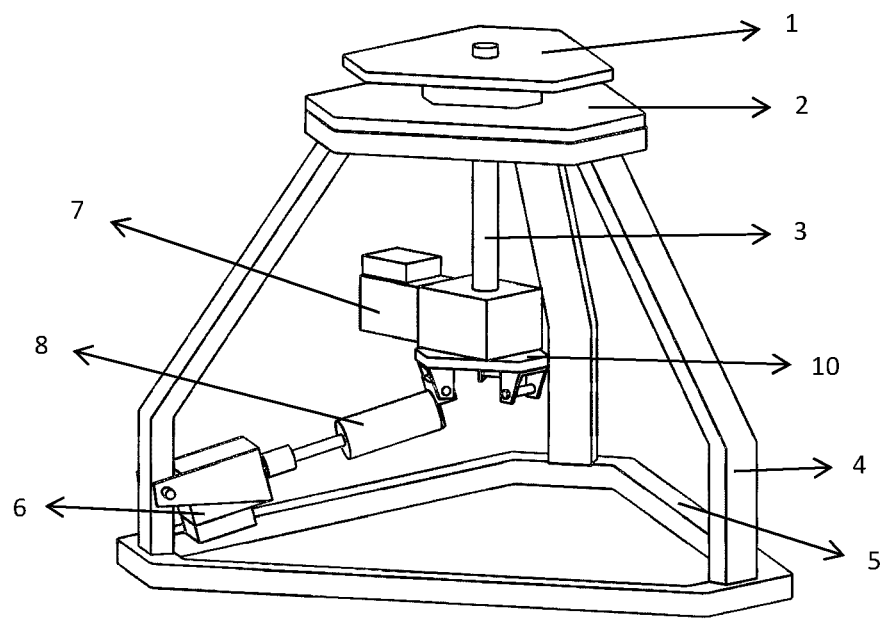
FIG. 9 is a schematic structural diagram of a bearing-type multi-dimensional motion platform using a unidirectional push rod solution according to the present disclosure.
Figure 10:
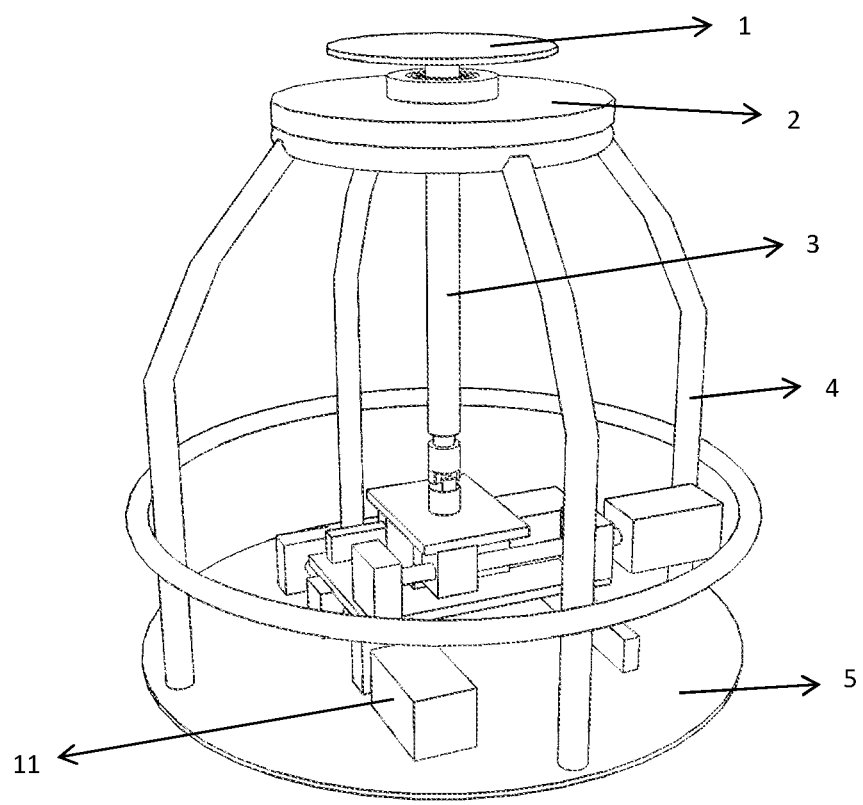
FIG. 10 is a schematic structural diagram of a bearing-type multi-dimensional motion platform using two electric lead screw slide rails according to the present disclosure.

Herein, the rotary compensation is calculated according to a plurality of algorithms, to achieve a smooth rotation and prevent dizziness. A rotation angle is compared with a predetermined extreme value. A maximum angle is determined first. Angles greater than the maximum angle are calculated as the maximum angle, to ensure uniform motion after a maximum speed is reached. Then, an interval angle of the calculation is extended to −90 to 90 degrees. Response curves are shown in FIG. 6 and FIG. 7.

The above-mentioned data is substituted into the algorithm, and two algorithms are taken into consideration at present.

Algorithm 1: a sine curve is used to calculate to obtain a parabola curve from −1 to 1, and then a set quantity of motor rotation pulses is multiplied, to obtain an actual quantity of pulses driving the motor to rotate.

Algorithm 2: uniform linear acceleration is used in calculation, to obtain a linear segment from −1 to 1, and the set quantity of motor rotation pulses is also multiplied, to calculate an actual quantity of pulses.

Besides controlling rotation by controlling a head, the system further supports combination with motion of the motion platform simultaneously or independently. The motion platform is controlled by a motion platform control signal received by the control system. A motion signal is a vector including a direction, an elevation angle and a rotation angle. Unlike data used by a traditional motion platform (the traditional motion platform uses displacement component data of each electric cylinder, the disadvantage of the data is that motion platforms having different structures have independent data rules and structures), the advantage of the motion signal is that the motion signal can adapt to a future motion platform having any structures. The rotation angle data in the motion signal can be selectively subjected to addition computation with the above-mentioned head rotation-control data to achieve a joint control effect.

Certainly, in an entire system, a head control platform and the motion platform can work independently or separately.

Head tracking control may be used alone, the motion platform can also be used alone, or a combination of the two can also be used.

To improve control precision, the above-mentioned motion control method further includes a step of performing track correction by using a built-in or external magnetic sensor of the head-mounted display device. To avoid misoperation, the above-mentioned information header is preferably device identification ID. To prevent jitter, the above-mentioned sending rate at which a calculated current status difference is fed into the action control system is preferably greater than 10 packet/second.

A specific structure of the multi-dimensional motion platform in the motion control method includes a support unit and a traction unit. The support unit includes a motion platform 1, a thrust universal spherical plain bearing 14, a bearing platform 2, a motion and rotation traction rod 3 and a bearing bracket 4. The thrust universal spherical plain bearing 14 includes a shaft washer and a housing washer. The upper end of the motion and rotation traction rod is fixed in the shaft washer of the thrust universal spherical plain bearing. The lower bottom surface of the motion platform is fixedly connected to the upper end surface of the joint shaft washer of the thrust universal spherical plain bearing. The housing washer of the thrust universal spherical plain bearing is fixedly connected to the bearing platform. The bearing platform is arranged on a bearing foundation 5 through the bearing bracket. The traction unit includes a universal extension coupling, a rotation motor 7, a traction platform 10 and at least one traction assembly. The lower end of the motion and rotation traction rod is connected to the output end of the rotation motor through the universal extension coupling. The rotation motor is fixed on the traction platform. One end of the traction assembly is connected to the traction platform, and the other end of the traction assembly is connected to the bearing bracket, so as to adjust a tilt angle of the traction platform.

There are two types of different traction assemblies.

Type 1 is a ball screw assembly type. The traction unit has one, two, or three traction assemblies. The traction assembly includes a traction motor 6 and a ball screw assembly 8. The traction motor is hinged with the bearing bracket. The output shaft of the traction motor is fixedly connected to a lead screw of the ball screw assembly. A nut of the ball screw assembly is hinged with the traction platform. When the traction unit has two traction assemblies, an included angle between traction directions or traction direction projections of the two traction assemblies is 90 degrees. When the traction unit has three traction assemblies, an included angle between traction directions of any two traction assemblies is the same.

Type 2 is an electric screw rod slide rail type. The traction unit has one or two traction assemblies. When the traction unit has one traction assembly, the traction assembly is an electric screw rod slide rail 11 of which a slide rail is fixed on the bearing bracket or the bearing foundation and of which a slide block is fixed to the traction platform. When the traction unit has two traction assemblies, the first traction assembly is an electric screw rod slide rail of which a slide rail is fixed on the bearing bracket or the bearing foundation, the second traction assembly is an electric screw rod slide rail of which a slide rail is fixed on a slide block of the first traction assembly and of which a slide block is fixed to the traction platform, and an included angle between the two electric screw rod slide rails is 90 degrees.

The multi-dimensional motion platform of the present disclosure includes a support unit and a traction unit. The support unit includes a motion platform 1, a thrust universal spherical plain bearing 14, a bearing platform 2, a motion and rotation traction rod 3 and a bearing bracket 4. The traction unit includes a universal extension coupling 9, a rotation motor 7, a traction platform 10 and at least one traction assembly.

The thrust universal spherical plain bearing has at least five structures.

A structure-1 thrust universal spherical plain bearing is a common thrust universal spherical plain bearing and generally includes a shaft washer 16 and a housing washer 15.

Structure-2 to structure-5 thrust universal spherical plain bearings are distinctive thrust universal spherical plain bearings 14 of the present disclosure.

Figure 20:
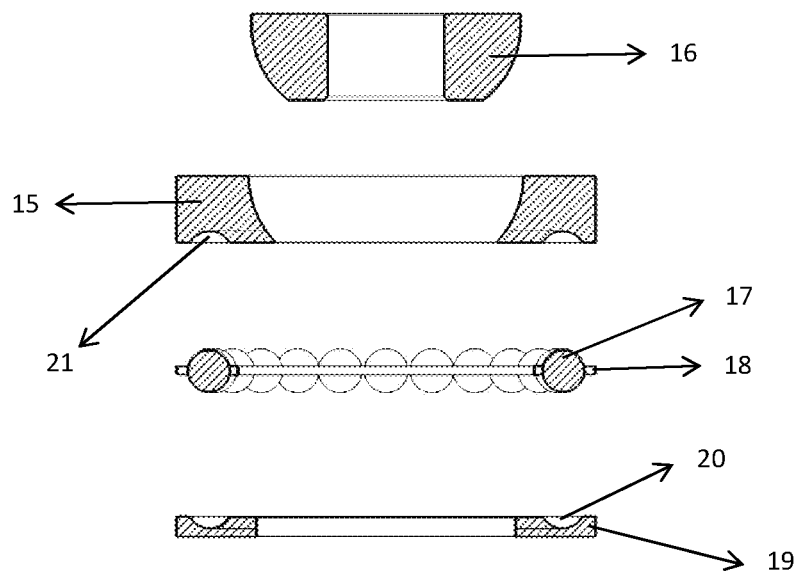
FIG. 20 is an exploded cutaway drawing of a structure-1 thrust universal spherical plain bearing according to the present disclosure.

FIG. 20 shows the structure-2 thrust universal spherical plain bearing, including a bearing block, a shaft washer 16, a housing washer 15 and a plane thrust bearing assembly. The shaft washer 16 is a semi-spherical shaft washer. The plane thrust bearing assembly includes first balls 17, a cage 18, a bottom pad 19, an upper rail 21 arranged on the lower bottom surface of the housing washer of the thrust universal spherical plain bearing and a lower rail 20 arranged on the upper bottom surface of the bottom pad. The lower bottom surface of the bottom pad of the plane thrust bearing assembly is fixedly connected to the bearing platform 2.

Figure 21:
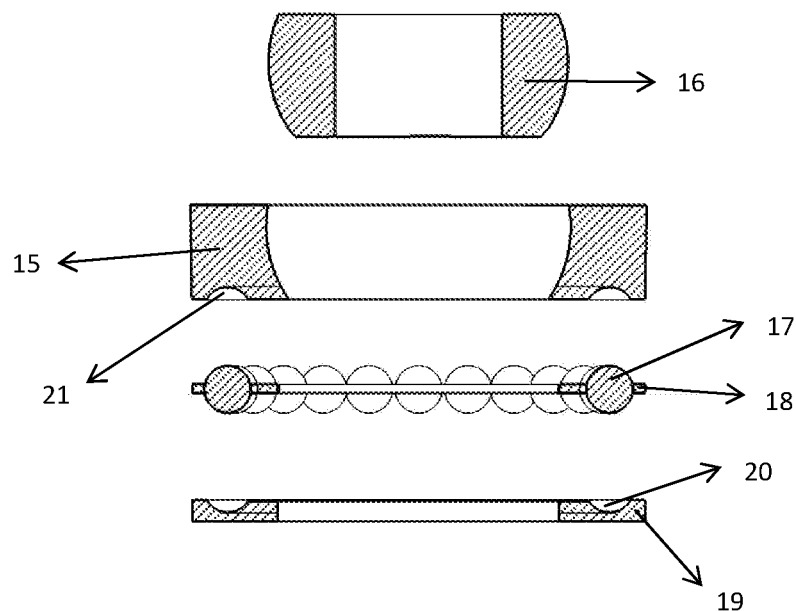
FIG. 21 is an exploded cutaway drawing of a structure-2 thrust universal spherical plain bearing according to the present disclosure.

As shown in FIG. 21, a difference of the structure-3 thrust universal spherical plain bearing from the structure-2 thrust universal spherical plain bearing is that the shaft washer 16 is a shaft washer having a plurality of semi-spherical surfaces.

Figure 22:
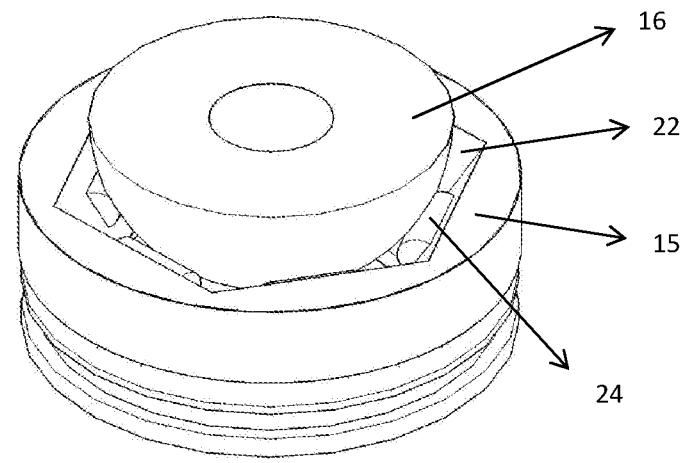
FIG. 22 is an outline drawing of a structure-3 thrust universal spherical plain bearing according to the present disclosure.
Figure 23:
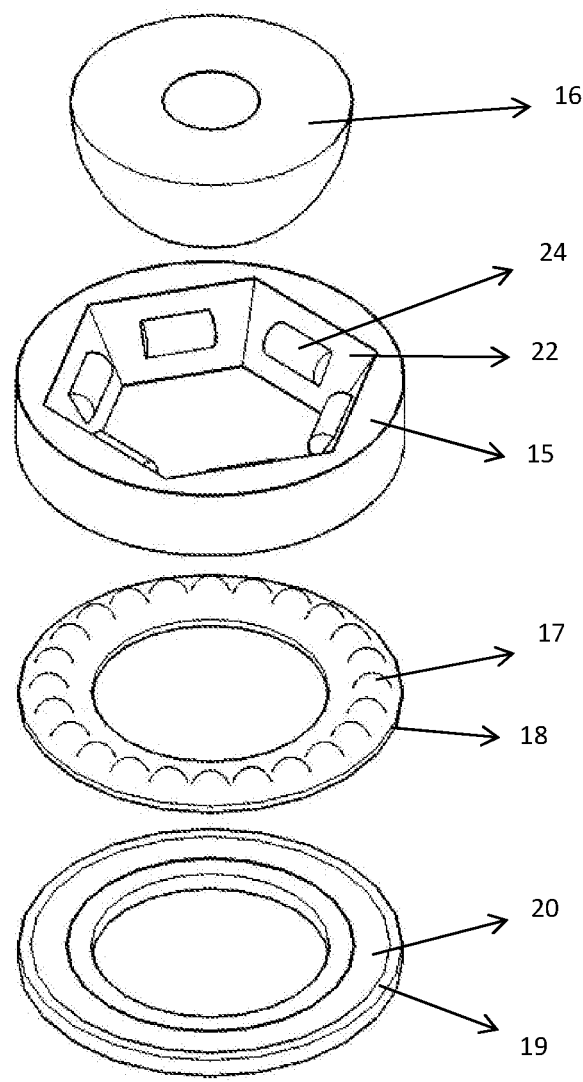
FIG. 23 is an exploded diagram of FIG. 22.
Figure 24:
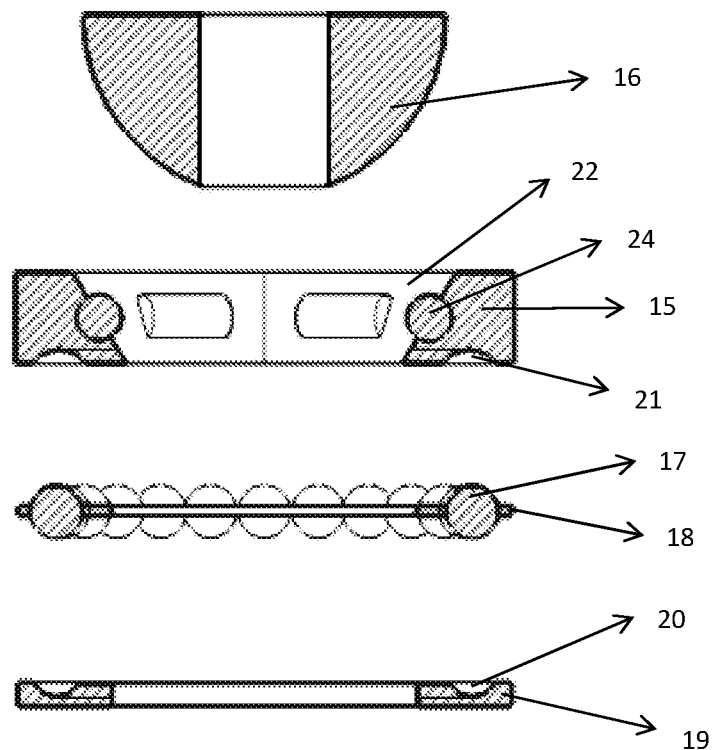
FIG. 24 is a cutaway drawing of a structure-3 thrust universal spherical plain bearing according to the present disclosure.
Figure 25:
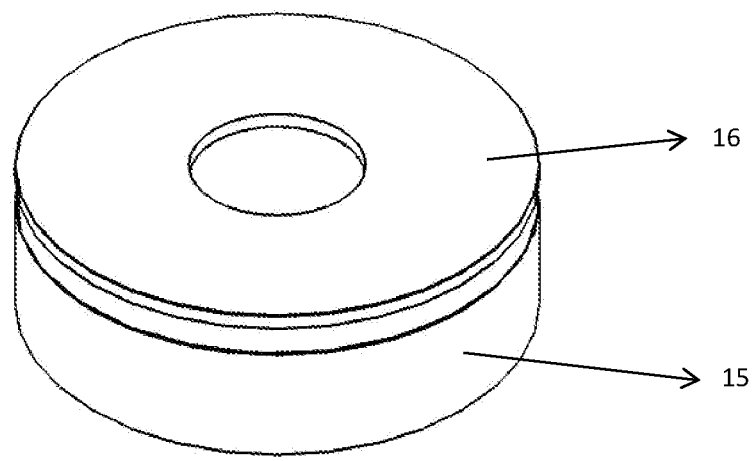
FIG. 25 is a three-dimensional view of a structure-4 thrust universal spherical plain bearing according to the present disclosure.
Figure 26:
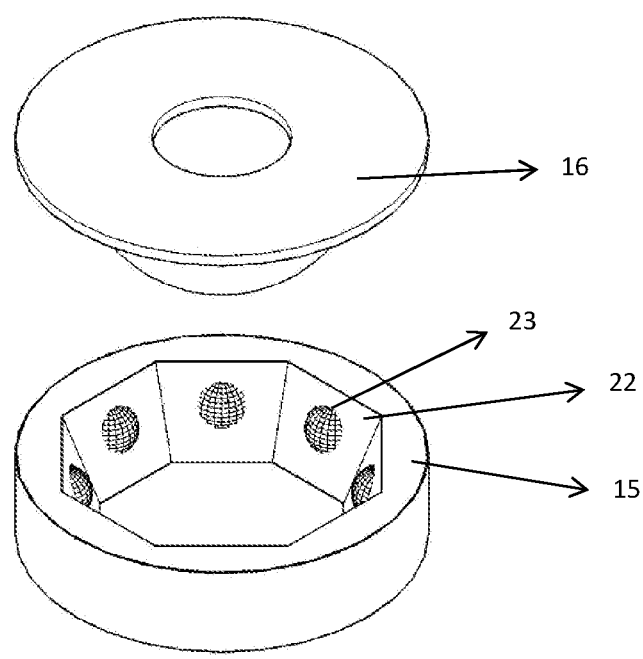
FIG. 26 is an exploded diagram of FIG. 25.
Figure 27:
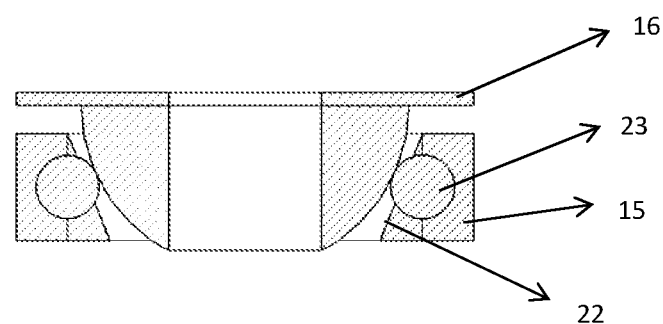
FIG. 27 is a cutaway drawing of a structure-4 thrust universal spherical plain bearing according to the present disclosure.
Figure 28:
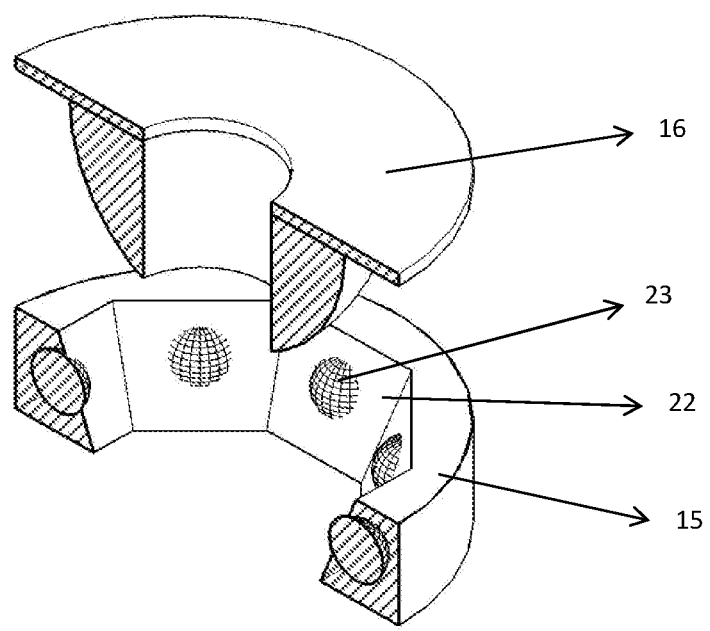
FIG. 28 is an exploded cutaway drawing of a structure-4 thrust universal spherical plain bearing according to the present disclosure.

As shown in FIG. 22, FIG. 23 and FIG. 24, the structure-4 thrust universal spherical plain bearing includes a shaft washer 16, a housing washer 15, a roller assembly and a plane thrust bearing assembly. The inner side surface of the housing washer 15 of the thrust universal spherical plain bearing 14 is a polygonal pyramid surface 22. The roller assembly includes a roller pit formed in each side of the polygonal pyramid surface and a roller arranged in each roller pit. A plurality of rollers are arranged on a same plane, arranged laterally, and in contact with the spherical outer surface of the shaft washer of the thrust universal spherical plain bearing separately. The plane thrust bearing assembly is the same as the plane thrust bearing assembly of the structure-1 thrust universal spherical plain bearing in structure.

As shown in FIG. 25, FIG. 26, FIG. 27 and FIG. 28, the structure-5 thrust universal spherical plain bearing includes a shaft washer 16, a housing washer 15 and a ball assembly. The inner side surface of the housing washer of the thrust universal spherical plain bearing is a polygonal pyramid surface 22. The ball assembly includes a ball pit formed in each side of the polygonal pyramid surface 22 and a first ball 17 arranged in each ball pit. A plurality of balls are arranged on a same plane and are in contact with the spherical outer surface of the shaft washer of the thrust universal spherical plain bearing separately.

Figure 18:
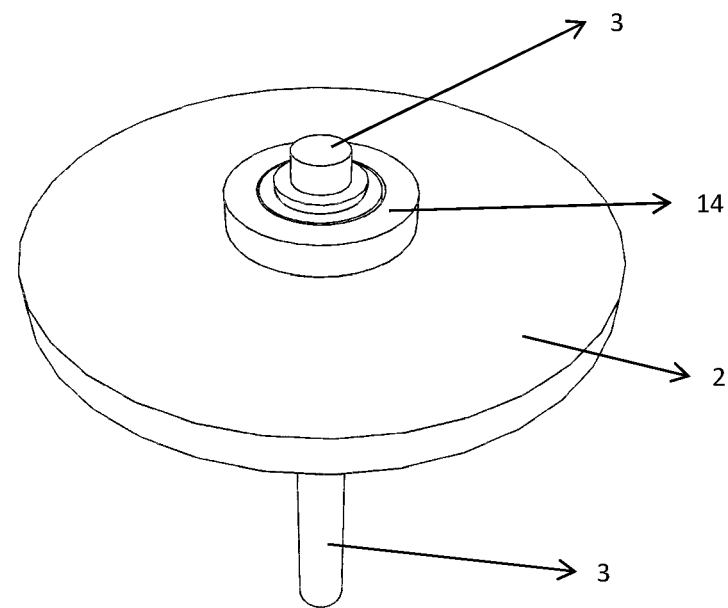
FIG. 18 is a schematic structural diagram of a thrust universal spherical plain bearing, a bearing platform and a motion and rotation traction rod according to the present disclosure.
Figure 19:
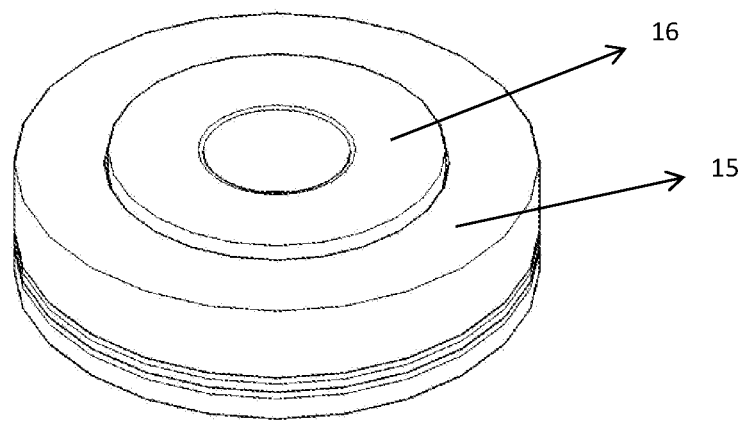
FIG. 19 is outline drawings of a structure-1 thrust universal spherical plain bearing and a structure-2 thrust universal spherical plain bearing according to the present disclosure.

As shown in FIG. 18, the upper end of the motion and rotation traction rod 3 is fixed into the shaft washer of the thrust universal spherical plain bearing 14. The lower bottom surface of the motion platform 1 is fixedly connected to the upper end surface of the joint shaft washer of the thrust universal spherical plain bearing 14. The housing washer 15, the bottom pad 19, or the bearing block of the thrust universal spherical plain bearing is fixedly connected to the bearing platform 2.

The bearing platform 2 is arranged on the bearing foundation 5 through the bearing bracket 4. The lower end of the motion and rotation traction rod 3 is connected to the output end of the rotation motor 7 through the universal extension coupling 9. The rotation motor 7 is fixed on the traction platform 10. One end of the traction assembly is connected to the traction platform 10, and the other end of the traction assembly is connected to the bearing bracket 4, so as to adjust a tilt angle of the traction platform 10.

The traction assembly has two different solutions.

Solution 1 uses an electric ball screw assembly 8, including one, two, or three traction assemblies. When two traction assemblies are used, an included angle between traction directions or traction direction projections of the two traction assemblies is 90 degrees. When three traction assemblies are used, an included angle between traction directions of any two traction assemblies is the same or an included angle between traction direction projections is 120 degrees.

The traction assembly includes a traction motor 6 and a ball screw assembly 8. The traction motor 6 is hinged with the bearing bracket 4. The output shaft of the traction motor 6 is fixedly connected to a lead screw of the ball screw assembly 8. A nut 81 of the ball screw assembly is hinged with the traction platform 10.

Solution 2 uses an electric screw rod slide rail, including two structures.

When there is one electric screw rod slide rail, the traction assembly is an electric screw rod slide rail 11 of which a slide rail is fixed on the bearing bracket 4 or the bearing foundation 5 and of which a slide block 12 is fixed to the traction platform 10.

Figure 16:
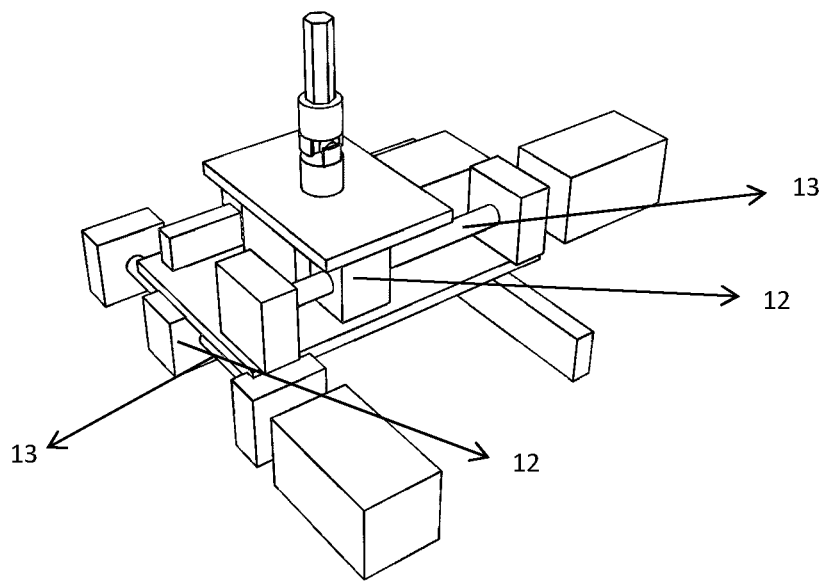
FIG. 16 is a schematic structural diagram of two electric lead screw slide rails, a traction platform and a universal extension coupling according to the present disclosure.
Figure 17:
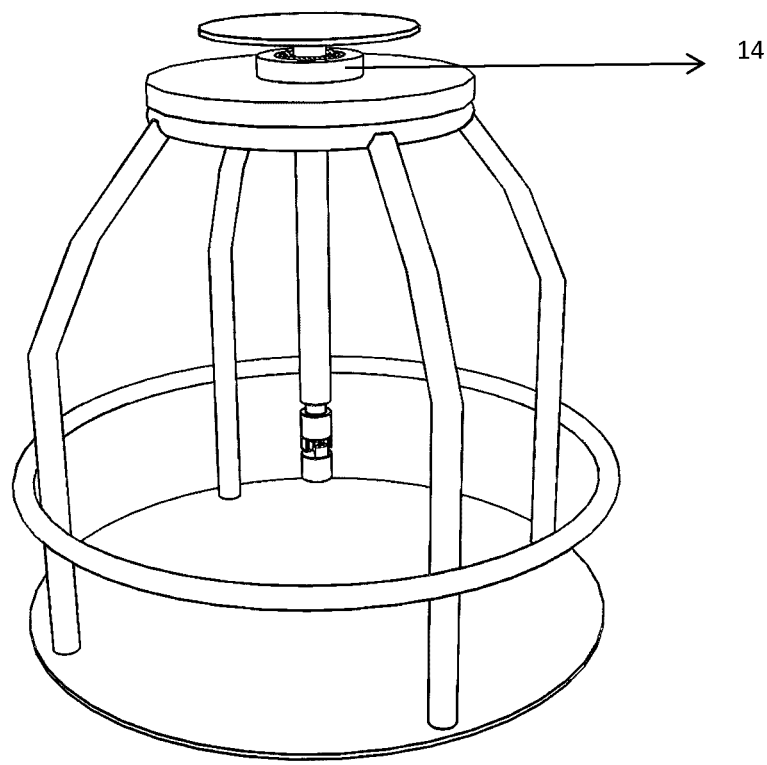
FIG. 17 is a schematic structural diagram of a bearing bracket according to the present disclosure.

As shown in FIG. 16, when there are two electric screw rod slide rails, a slide rail 13 of the first electric screw rod slide rail is fixed on the bearing bracket 4 or the bearing foundation 5, a slide rail 13 of the second electric screw rod slide rail is fixed on a slide block 12 of the first traction assembly, a slide block 12 of the second electric screw rod slide rail is fixed to the traction platform, and an included angle between the two electric screw rod slide rails is 90 degrees.

Figure 13:
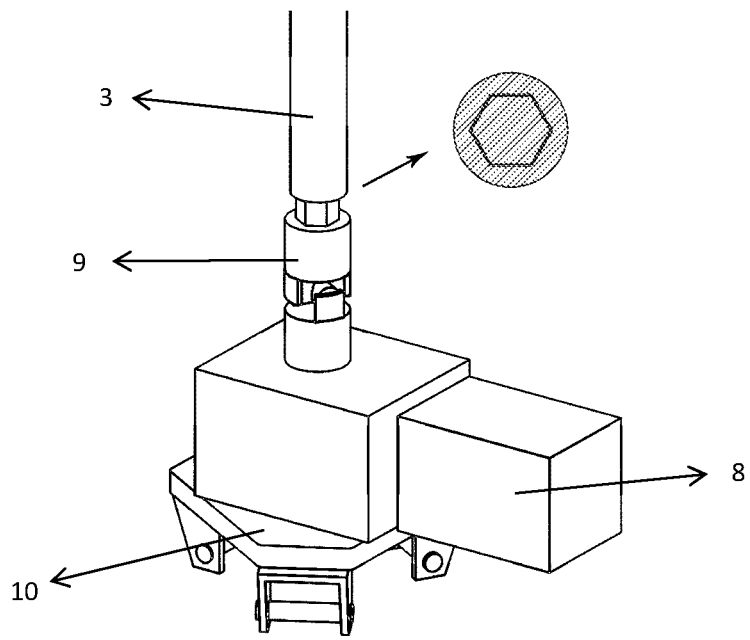
FIG. 13 is a schematic diagram of a universal extension coupling, a rotation motor and a traction platform according to the present disclosure.

As shown in FIG. 13, the universal extension coupling 9 includes an inner shaft and a sleeve. The upper end of the sleeve is fixedly connected to the motion and rotation traction rod 3. The lower end of the inner shaft is connected to the output end of the rotation motor 7. A polygonal cavity is formed in the lower end surface of the sleeve. The upper end of the inner shaft is a polygonal cylinder. The polygonal cylinder and the polygonal cavity are matched with each other. The polygonal cylinder can slide freely in the polygonal cavity.

The multi-dimensional motion platform of the present disclosure includes a support unit and a traction unit. The support unit includes a motion platform 1, a thrust universal spherical plain bearing 14, a bearing platform 2, a motion and rotation traction rod 3 and a bearing bracket 4. The traction unit includes a universal extension coupling 9, a rotation motor 7, a traction platform 10 and at least one traction assembly.

The thrust universal spherical plain bearing has at least five structures.

A structure-1 thrust universal spherical plain bearing is a common thrust universal spherical plain bearing and generally includes a shaft washer 16 and a housing washer 15.

Structure-2 to structure-5 thrust universal spherical plain bearings are distinctive thrust universal spherical plain bearings 14 of the present disclosure.

As shown in FIG. 20, the structure-2 thrust universal spherical plain bearing includes a bearing block, a shaft washer 16, a housing washer 15 and a plane thrust bearing assembly. The shaft washer 16 is a semi-spherical shaft washer. The plane thrust bearing assembly includes first balls 23, a cage 18, a bottom pad 19, an upper rail 21 arranged on the lower bottom surface of the housing washer of the thrust universal spherical plain bearing and a lower rail 20 arranged on the upper bottom surface of the bottom pad. The lower bottom surface of the bottom pad of the plane thrust bearing assembly is fixedly connected to the bearing platform 2.

As shown in FIG. 21, a difference of the structure-3 thrust universal spherical plain bearing from the structure-2 thrust universal spherical plain bearing is that the shaft washer 16 is a shaft washer having a plurality of semi-spherical surfaces.

As shown in FIG. 22, FIG. 23 and FIG. 24, the structure-4 thrust universal spherical plain bearing includes a shaft washer 16, a housing washer 15, a roller assembly and a plane thrust bearing assembly. The inner side surface of the housing washer 15 of the thrust universal spherical plain bearing 14 is a polygonal pyramid surface 22. The roller assembly includes a roller pit formed in each side of the polygonal pyramid surface and a roller arranged in each roller pit. A plurality of rollers are arranged on a same plane, arranged laterally, and in contact with the spherical outer surface of the shaft washer of the thrust universal spherical plain bearing separately. The plane thrust bearing assembly is the same as the plane thrust bearing assembly of the structure-1 thrust universal spherical plain bearing in structure.

As shown in FIG. 25, FIG. 26, FIG. 27 and FIG. 28, the structure-5 thrust universal spherical plain bearing includes a shaft washer 16, a housing washer 15 and a ball assembly. The inner side surface of the housing washer of the thrust universal spherical plain bearing is a polygonal pyramid surface 22. The ball assembly includes a ball pit formed in each side of the polygonal pyramid surface 22 and a first ball 17 arranged in each ball pit. A plurality of balls are arranged on a same plane and are in contact with the spherical outer surface of the shaft washer of the thrust universal spherical plain bearing separately.

Figure 11:
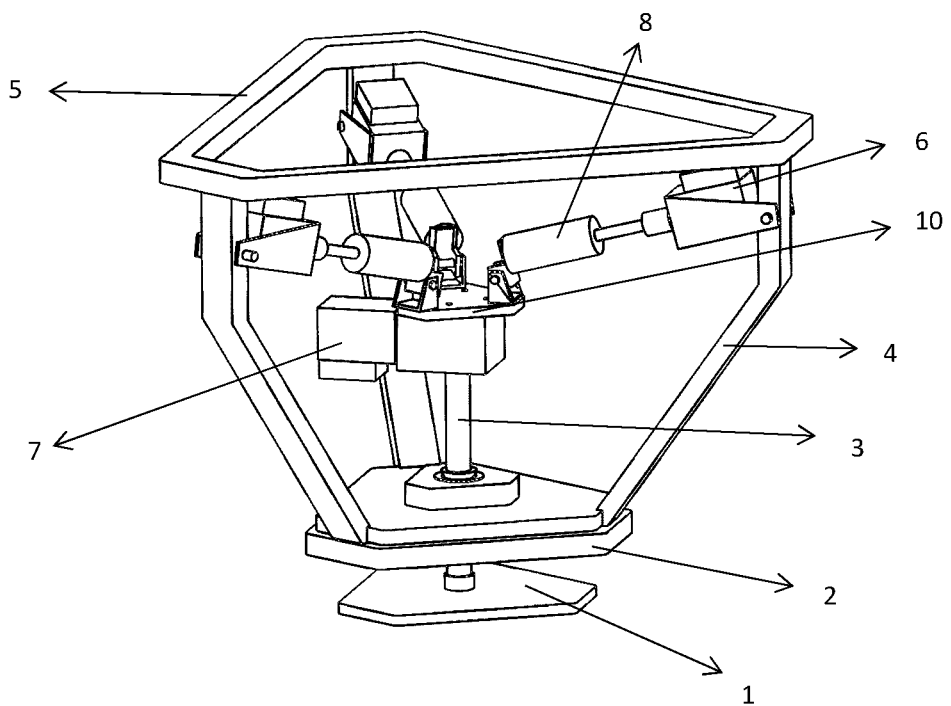
FIG. 11 is a schematic structural diagram of a lifting-type multi-dimensional motion platform using a triangular push rod solution according to the present disclosure.
Figure 12:
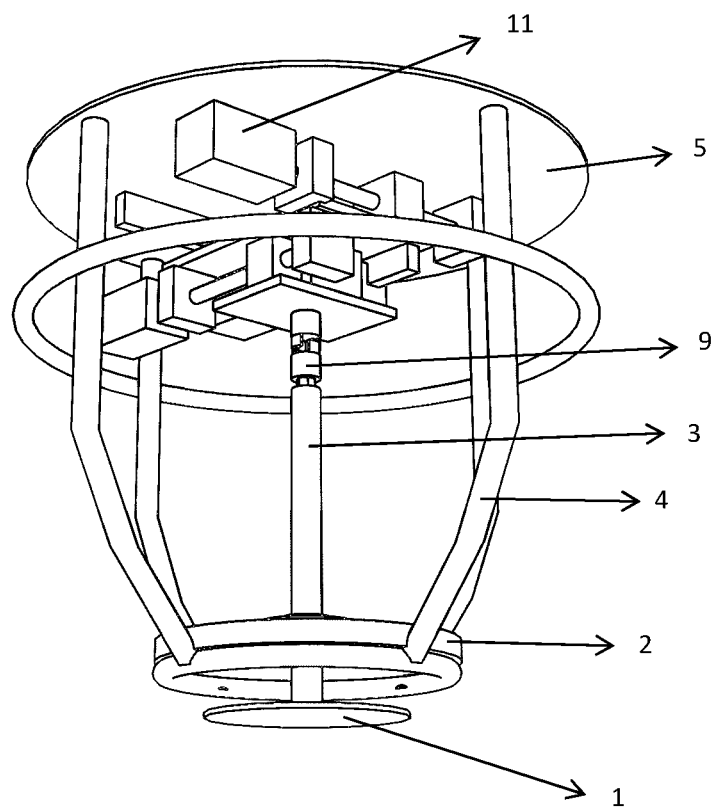
FIG. 12 is a schematic structural diagram of a lifting-type multi-dimensional motion platform using two electric lead screw slide rails according to the present disclosure.

As shown in FIG. 11, the lower end of the motion and rotation traction rod 3 is fixed in the shaft washer of the thrust universal spherical plain bearing 14. The upper bottom surface of the motion platform 1 is fixedly connected to the lower end surface of the joint shaft washer of the thrust universal spherical plain bearing. The housing washer, the bottom pad, or the bearing block of the thrust universal spherical plain bearing 14 is fixedly connected to the bearing platform 2.

The bearing platform 2 is arranged on the bearing foundation 5 located above or a hanging rail through a bearing bracket or a hanger 4. The upper end of the motion and rotation traction rod 3 is connected to the output end of the rotation motor 7 through the universal extension coupling 9. The rotation motor 7 is fixed on the traction platform 10. One end of the traction assembly is connected to the traction platform 10, and the other end of the traction assembly is connected to the bearing support or hanger 4, so as to adjust a tilt angle of the traction platform.

The traction assembly has two different solutions.

Solution 1 uses a ball screw assembly, including one, two, or three traction assemblies. When two traction assemblies are used, an included angle between traction directions or traction direction projections of the two traction assemblies is 90 degrees. When three traction assemblies are used, an included angle between traction directions of any two traction assemblies are the same or an included angle between traction direction projections is 120 degrees.

Figure 14:
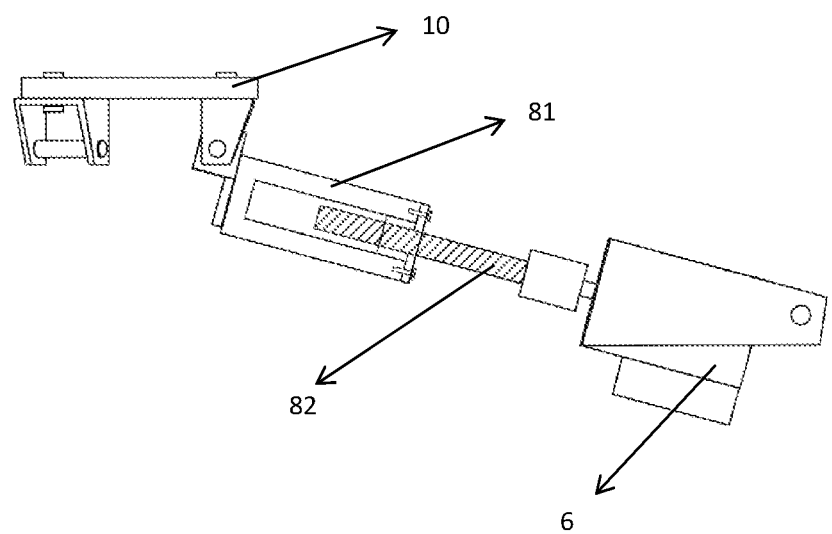
FIG. 14 is a schematic diagram of a traction assembly of a ball screw assembly according to the present disclosure.
Figure 15:
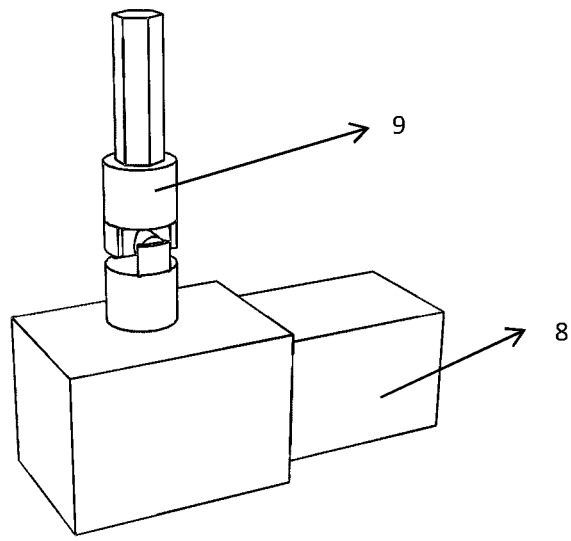
FIG. 15 is a schematic structural diagram of a rotation motor and a universal extension coupling according to the present disclosure.

As shown in FIG. 14, the traction assembly includes a traction motor 6 and a ball screw assembly 8. The traction motor 6 is hinged with the bearing bracket or the hanger 4. The output shaft of the traction motor is fixedly connected to a lead screw of the ball screw assembly. A nut 81 of the ball screw assembly is hinged with the traction platform 10.

Solution 2 uses an electric screw rod slide rail, including two structures.

When there is one electric screw rod slide rail, the traction assembly is an electric screw rod slide rail of which a slide rail 13 is fixed on the bearing bracket or the bearing foundation and of which a slide block is fixed to the traction platform.

When there are two electric screw rod slide rails, a slide rail 13 of the first electric screw rod slide rail is fixed to the bearing bracket or the bearing foundation, a slide rail of the second electric screw rod slide rail is fixed on a slide block 12 of the first traction assembly, a slide block of the second electric screw rod slide rail is fixed to the traction platform, and an included angle between the two electric screw rod slide rails is 90 degrees.

The universal extension coupling includes an inner shaft and a sleeve. The upper end of the sleeve is fixedly connected to the output end of a rotation motor and the motion and rotation traction rod. The lower end of the inner shaft is connected to the output end of the rotation motor and the motion and rotation traction rod. A polygonal cavity is formed in the lower end surface of the sleeve. The upper end of the inner shaft is a polygonal cylinder. The polygonal cylinder and the polygonal cavity are matched with each other. The polygonal cylinder can slide freely in the polygonal cavity.

The thrust universal spherical plain bearing has four structures.

As shown in FIG. 20, the structure-1 thrust universal spherical plain bearing includes a bearing block, a shaft washer 16, a housing washer 15 and a plane thrust bearing assembly. The shaft washer is a semi-spherical shaft washer. The plane thrust bearing assembly includes first balls 17, a cage 18, a bottom pad 19, an upper rail 21 arranged on the lower bottom surface of the housing washer of the thrust universal spherical plain bearing and a lower rail 20 arranged on the upper bottom surface of the bottom pad. The lower bottom surface of the bottom pad 19 of the plane thrust bearing assembly is fixedly connected to the bearing platform 2.

As shown in FIG. 21, a difference of the structure-2 thrust universal spherical plain bearing from the structure-1 thrust universal spherical plain bearing is that the shaft washer is a shaft washer having a plurality of semi-spherical surfaces.

As shown in FIG. 22, FIG. 23 and FIG. 24, the structure-3 thrust universal spherical plain bearing includes a shaft washer 16, a housing washer 15, a roller assembly and a plane thrust bearing assembly. The inner side surface of the housing washer of the thrust universal spherical plain bearing is a polygonal pyramid surface 22. The roller assembly includes a roller pit formed in each side of the polygonal pyramid surface and a roller arranged in each roller pit. A plurality of rollers are arranged on a same plane, arranged laterally, and in contact with the spherical outer surface of the shaft washer of the thrust universal spherical plain bearing separately. The plane thrust bearing assembly is the same as the plane thrust bearing assembly of the structure-1 thrust universal spherical plain bearing in structure.

As shown in FIG. 25, FIG. 26, FIG. 27 and FIG. 28, the structure-4 thrust universal spherical plain bearing includes a shaft washer 16, a housing washer 15 and a ball assembly. The inner side surface of the housing washer of the thrust universal spherical plain bearing is a polygonal pyramid surface 22. The ball assembly includes a ball pit formed in each side of the polygonal pyramid surface 22 and a first ball 17 arranged in each ball pit. A plurality of balls are arranged on a same plane and are in contact with the spherical outer surface of the shaft washer of the thrust universal spherical plain bearing separately.

The multi-dimensional motion platform of the present disclosure includes a support unit and a traction unit. The support unit includes a motion platform 1, a thrust universal spherical plain bearing 14, a bearing platform 2, a motion and rotation traction rod 3 and a bearing bracket 4. The traction unit includes a universal extension coupling 9, a rotation motor 7, a traction platform 10 and at least one traction assembly.

The upper end of the motion and rotation traction rod 3 is fixed in the shaft washer 16 of the thrust universal spherical plain bearing 14. The lower bottom surface of the motion platform 1 is fixedly connected to the upper end surface of the joint shaft washer of the thrust universal spherical plain bearing. The housing washer, the bottom pad, or the bearing block of the thrust universal spherical plain bearing is fixedly connected to the bearing platform.

The bearing platform 2 is arranged on the bearing foundation through the bearing bracket 4. The lower end of the motion and rotation traction rod is connected to the output end of the rotation motor through the universal extension coupling. The rotation motor is fixed on the traction platform. One end of the traction assembly is connected to the traction platform, and the other end of the traction assembly is connected to the bearing bracket, so as to adjust a tilt angle of the traction platform.

The traction assembly has two different solutions.

Solution 1 uses a ball screw assembly, including one, two, or three traction assemblies. When two traction assemblies are used, an included angle between traction directions or traction direction projections of the two traction assemblies is 90 degrees. When three traction assemblies are used, an included angle between traction directions of any two traction assemblies are the same or an included angle between traction direction projections is 120 degrees.

The traction assembly includes a traction motor 6 and a ball screw assembly 8. The traction motor is hinged with the bearing bracket. The output shaft of the traction motor is fixedly connected to a lead screw of the ball screw assembly. A nut of the ball screw assembly is hinged with the traction platform.

Solution 2 uses an electric screw rod slide rail, including two structures.

When there is one electric screw rod slide rail, the traction assembly is an electric screw rod slide rail 11 of which a slide rail 13 is fixed on the bearing bracket or the bearing foundation and of which a slide block 12 is fixed to the traction platform.

When there are two electric screw rod slide rails, a slide rail of the first electric screw rod slide rail is fixed on the bearing bracket or the bearing foundation, a slide rail of the second electric screw rod slide rail is fixed on a slide block of the first traction assembly, a slide block of the second electric screw rod slide rail is fixed to the traction platform, and an included angle between the two electric screw rod slide rails is 90 degrees.

The universal extension coupling includes an inner shaft and a sleeve. The upper end of the sleeve is fixedly connected to the motion and rotation traction rod. The lower end of the inner shaft is connected to the output end of the rotation motor. A polygonal cavity is formed in the lower end surface of the sleeve. The upper end of the inner shaft is a polygonal cylinder. The polygonal cylinder and the polygonal cavity are matched with each other. The polygonal cylinder can slide freely in the polygonal cavity.

The invention claimed is:

1. A multi-dimensional motion platform, comprising a support unit and a traction unit, wherein,
   the support unit comprises a motion platform, a thrust universal spherical plain bearing, a bearing platform, a motion and rotation traction rod and a bearing bracket;
   the thrust universal spherical plain bearing comprises a shaft washer and a housing washer;
   an upper end of the motion and rotation traction rod is fixed in the shaft washer of the thrust universal spherical plain bearing;
   a lower bottom surface of the motion platform is fixedly connected to an upper end surface of the joint shaft washer of the thrust universal spherical plain bearing;
   the housing washer of the thrust universal spherical plain bearing is fixedly connected to the bearing platform;
   the bearing platform is arranged on a bearing foundation through the bearing bracket;
   the traction unit comprises a universal extension coupling, a rotation motor, a traction platform and at least one traction assembly;
   a lower end of the motion and rotation traction rod is connected to an output end of the rotation motor through the universal extension coupling;
   the rotation motor is fixed on the traction platform; and
   a first end of a traction assembly is connected to the traction platform, and a second end of the traction assembly is connected to the bearing bracket and is configured to adjust a tilt angle of the traction platform.

2. The multi-dimensional motion platform according to claim 1, wherein, the traction assembly comprises a traction motor and a ball screw assembly;
   the traction motor is hinged with the bearing bracket, an output shaft of the traction motor is fixedly connected to a lead screw of the ball screw assembly, and a nut of the ball screw assembly is hinged with the traction platform; and
   a number of the traction assembly is one, two or three; and when the number of the traction assemblies is two, an included angle between the traction directions or traction direction projections of the two traction assemblies is 90 degrees; when the number of the traction assemblies is three, an included angle between traction directions of any two traction assemblies is the same.

3. The multi-dimensional motion platform according to claim 1, wherein,
   when the traction unit has one traction assembly,
   the traction assembly is an electric screw rod slide rail of which a slide rail is fixed on the bearing bracket or the bearing foundation and of which a slide block is fixed to the traction platform; or
   when the traction unit has two traction assemblies,
   the first traction assembly is an electric screw rod slide rail of which a slide rail is fixed on the bearing bracket or the bearing foundation;
   the second traction assembly is an electric screw rod slide rail of which a slide rail is fixed on a slide block of the first traction assembly and of which a slide block is fixed to the traction platform; and
   an included angle between the two electric screw rod slide rails is 90 degrees.

4. A multi-dimensional motion platform, comprising a support unit and a traction unit, wherein,
   the support unit comprises a motion platform, a thrust universal spherical plain bearing, a bearing platform, a motion and rotation traction rod and a bearing bracket;
   the thrust universal spherical plain bearing comprises a shaft washer and a housing washer;
   the lower end of the motion and rotation traction rod extends through the shaft washer fixed to the thrust universal spherical plain bearing and is fixedly connected to an upper bottom surface of the motion platform; and the upper bottom surface of the motion platform is fixedly connected to a lower end surface of the joint shaft washer of the thrust universal spherical plain bearing;
   the housing washer of the thrust universal spherical plain bearing is fixedly connected to the bearing platform;
   the bearing platform is arranged on the bearing foundation or a hanging rail through the bearing bracket or a hanger;
   the traction unit comprises a universal extension coupling, a rotation motor, a traction platform and at least one traction assembly;
   an upper end of the motion and rotation traction rod is connected to the output end of the rotation motor through the universal extension coupling;
   the rotation motor is fixed to the traction platform; and
   a first end of a traction assembly is connected to the traction platform, and a second end of the traction assembly is connected to the bearing bracket and is configured to adjust a tilt angle of the traction platform.

5. The multi-dimensional motion platform according to claim 4, wherein, the traction assembly comprises a traction motor and a ball screw assembly;
   the traction motor is hinged with the bearing bracket, an output shaft of the traction motor is fixedly connected to a lead screw of the ball screw assembly, and a nut of the ball screw assembly is hinged with the traction platform;
   a number of the traction assembly is one, two or three; and
   when the number of the traction assemblies is two, an included angle between traction directions or traction direction projections of the two traction assemblies is 90 degrees; when the number of the traction assemblies is three, an included angle between traction directions of any two traction assemblies are the same.

6. The multi-dimensional motion platform according to claim 4, wherein,
   when the traction unit has one traction assembly,
   the traction assembly is an electric screw rod slide rail of which a slide rail is fixed on the bearing bracket or the bearing foundation and of which a slide block is fixed to the traction platform;
   when the traction unit has two traction assemblies,
   the first traction assembly is an electric screw rod slide rail of which a slide rail is fixed on the bearing bracket or the bearing foundation;
   the second traction assembly is an electric screw rod slide rail of which a slide rail is fixed on a slide block of the first traction assembly and of which a slide block is fixed to the traction platform; and
   an included angle between the two electric screw rod slide rails is 90 degrees.

7. A thrust universal spherical plain bearing, comprising a shaft washer and a housing washer, comprising:
- a plane thrust bearing assembly, wherein the plane thrust bearing assembly comprises a plurality of balls, a cage, a bottom pad, an upper rail arranged on a lower bottom surface of the housing washer of the thrust universal spherical plain bearing and a lower rail arranged on an upper bottom surface of the bottom pad; and
- the lower bottom surface of the bottom pad of the plane thrust bearing assembly is fixedly connected to a bearing platform.

8. The thrust universal spherical plain bearing according to claim 7, further comprising:
- a ball assembly, wherein
- an inner side surface of the housing washer of the thrust universal spherical plain bearing is a polygonal pyramid surface;
- the ball assembly comprises a ball pit formed in each side of the polygonal pyramid surface and a ball arranged in each ball pit; and
- the plurality of balls are arranged on a same plane and are in contact with a spherical outer surface of the shaft washer of the thrust universal spherical plain bearing separately.

9. The thrust universal spherical plain bearing according to claim 7, further comprising:
- a roller assembly;
- an inner side surface of the housing washer of the thrust universal spherical plain bearing is a polygonal pyramid surface;
- the roller assembly comprises a roller pit formed in each side of the polygonal pyramid surface and a roller arranged in each roller pit;
- a plurality of rollers are arranged on a same plane, arranged laterally, and in contact with a spherical outer surface of the shaft washer of the thrust universal spherical plain bearing separately.

10. A thrust universal spherical plain bearing, comprising a shaft washer and a housing washer, further comprising:
- a ball assembly, wherein
- an inner side surface of the housing washer of the thrust universal spherical plain bearing is a polygonal pyramid surface;
- the ball assembly comprises a ball pit formed in each side of the polygonal pyramid surface and a ball arranged in each ball pit; and
- a plurality of balls are arranged on a same plane and are in contact with a spherical outer surface of the shaft washer of the thrust universal spherical plain bearing separately.

* * * * *